United States Patent
Hsieh et al.

(10) Patent No.: US 8,704,149 B2
(45) Date of Patent: Apr. 22, 2014

(54) OPTOELECTRONIC DEVICE ASSEMBLY HAVING AUXILIARY ENERGY RECEIVER

(75) Inventors: Min-Hsun Hsieh, Hsinchu (TW); Tsung-Xian Lee, Hsinchu (TW)

(73) Assignee: Epistar Corporation, Hsinchu (TW)

( * ) Notice: Subject to any disclaimer, the term of this patent is extended or adjusted under 35 U.S.C. 154(b) by 559 days.

(21) Appl. No.: 12/263,332

(22) Filed: Oct. 31, 2008

(65) Prior Publication Data

US 2009/0146049 A1 Jun. 11, 2009

Related U.S. Application Data

(63) Continuation-in-part of application No. 11/598,839, filed on Nov. 14, 2006, now Pat. No. 7,454,119, which is a continuation-in-part of application No. 11/233,030, filed on Sep. 23, 2005, now Pat. No. 7,142,769.

(30) Foreign Application Priority Data

Sep. 24, 2004 (TW) ................................ 93129157 A
May 6, 2005 (TW) ................................ 94114630 A

(51) Int. Cl.
*H01J 3/14* (2006.01)
*H01J 5/16* (2006.01)

(52) U.S. Cl.
USPC ........ 250/216; 250/214 R; 359/363; 359/365; 356/218

(58) Field of Classification Search
USPC ............ 250/208.1, 208.2, 216, 214.1, 214 R; 359/363, 364, 365, 366; 356/218
See application file for complete search history.

(56) References Cited

U.S. PATENT DOCUMENTS

| | | | | |
|---|---|---|---|---|
| 4,225,782 | A * | 9/1980 | Kuppenheimer et al. | 250/216 |
| 4,893,612 | A * | 1/1990 | Dawson | 126/689 |
| 5,343,330 | A * | 8/1994 | Hoffman et al. | 359/708 |
| 5,973,858 | A * | 10/1999 | Sekita | 359/729 |
| 6,359,965 | B1 * | 3/2002 | Finkler et al. | 378/98.3 |
| 6,636,360 | B1 * | 10/2003 | Tanaka et al. | 359/678 |
| 6,717,045 | B2 * | 4/2004 | Chen | 136/246 |
| 2003/0127583 | A1 * | 7/2003 | Bechtel et al. | 250/216 |
| 2004/0150879 | A1 * | 8/2004 | Araki et al. | 359/365 |

* cited by examiner

*Primary Examiner* — Francis M Legasse, Jr.

(57) ABSTRACT

An embodiment of present invention discloses an optoelectronic device package including a first auxiliary energy receiver having a first energy inlet and a side wall for substantially directing energy far away from the first energy inlet; an optical element optically coupled to the first auxiliary energy receiver and having a recess facing the first energy inlet; and an optoelectronic device optically coupled to the optical element and receiving the energy from the first energy inlet.

8 Claims, 26 Drawing Sheets

OPTOELECTRONIC DEVICE ASSEMBLY HAVING AUXILIARY ENERGY RECEIVER

RELATED APPLICATIONS

This application is a continuation-in-part of Ser. No. 11/598,839 filed Nov. 14, 2006, which is a continuation-in-part of Ser. No. 11/233,030 filed Sep. 23, 2005, which claims priority to Taiwan applications No. 093129157, filed Sep. 24, 2004 and No. 094114630, filed May 6, 2005, the disclosures of which are incorporated herein by reference in their entirety.

BACKGROUND

1. Technical Field

The present invention relates to an energy collecting system, and more particularly to a solar energy collecting system and an optical lens integrated therewith.

2. Description of the Related Art

FIG. 1 illustrates a conventional Light Emitting Diode (LED) package 10 that includes an optical lens 11, a package base 12, and an LED chip 13. The LED package 10 has a longitudinal axis 15 passing through the center of the optical lens 11. The LED chip 13 is positioned on the package base 12. The package base 12 may have a cup (not shown) with a reflector (not shown) to reflect light emitted from the bottom and sides of the LED chip 13 towards the observer.

The optical lens 11 is coupled to the LED chip 13 to receive and redirect light emitted from the LED chip 13. The optical lens 11 may have a recess 14 to accommodate the LED chip 13. The light entering through the recess 14 of the optical lens 11 may travel in two main light paths. The first light path LP1 is that the light emitted from the LED chip 13 travels to the surface 1102 and is total-internal-reflected to exit through sidewall 1101 at approximately 90 degree to the longitudinal axis 15. The second light path LP2 is that the light emitted from the LED chip 13 travels towards the sidewall 1101 at an angle causing total internal reflection or a reflection from the sidewall 1101 to exit the optical lens 11 at an angle not close to perpendicular to the longitudinal axis 15. The first light path LP1 is preferable to generate an efficient side emitting light, while the second light path LP2 may cause a light spot, which is not desirable to the observer.

A need exists for an LED package or illumination device to reduce its entire size by coupling with a shallow optical lens and avoid light spots that the observer suffers from. A need also exists for an LED package or illumination device to provide uniform color light.

BRIEF SUMMARY

In accordance with one embodiment of the invention, an optoelectronic device package includes an optical element, a package base, and an optoelectronic device. The optoelectronic device is disposed on a surface of the package base. The optical element is attached to the package base and/or optoelectronic device. The optical element has a flared portion and a base portion. The flared portion is formed by an upper surface, a side surface, and a lower surface. The upper surface forms a recess of the flared portion. The side surface is adjacent to upper surface and obliquely angled with respect to a longitudinal axis approximately normal to a horizontal surface of the base portion. Besides, the side surface is curved, and preferably is formed as a concaved surface. The lower surface is adjacent to the side surface and connecting to the base portion. The optical element may be radially symmetric about the longitudinal axis.

In another embodiment of the invention, an optical element, comprised of a light-pervious material, comprises a base portion having a terrace; a flared portion protruding from the base portion and constructed from an upper surface forming a recess and having a proximal end and a distal end, a side surface, and a lower surface; and wherein the upper surface is substantially parallel to or departs far from the lower surface along a path from the proximal end to the distal end.

In accordance with another embodiment of the invention, the optical element is formed in a longitudinal direction, preferably, is bilaterally symmetric about a longitudinal plane passing through the optical element. Furthermore, a convex lens is formed on the upper surface. Specifically, the upper surface is formed as a ripply surface. The propagation direction of the ripples formed on the upper surface may be parallel to the longitudinal direction. The radius of the convex lens is about between 50-60 µm. The optoelectronic device is preferably arranged along the propagation direction.

In accordance with another embodiment of the invention, an optoelectronic device package includes a first auxiliary energy receiver having a first energy inlet and a side wall for substantially directing energy far away from the first energy inlet; an optical element optically coupled to the first auxiliary energy receiver and having a recess facing the first energy inlet; and an optoelectronic device optically coupled to the optical element and receiving the energy from the first energy inlet.

In further embodiment of present invention, an optoelectronic device package includes a first auxiliary energy receiver having a first level energy inlet and a second level energy inlet having an outer boundary and an inner boundary; and an optoelectronic device optically coupled to the first auxiliary energy receiver; wherein the outer boundary is substantially impervious to radiant energy receivable by the optoelectronic device, while the inner boundary is substantially pervious to the radiant energy. In addition, the inner boundary can be defined by an optical element described in each embodiment of present invention.

In another embodiment of present invention, an optoelectronic device package includes an optoelectronic device for converting radiant energy to electric energy; a first auxiliary energy receiver comprising a first energy inlet, a side wall, and an inner surface; and an optical element for substantially guiding the radiant energy from the first auxiliary energy receiver toward the optoelectronic device.

Moreover, a second auxiliary energy receiver can be optionally integrated with or optically coupled to the first auxiliary energy receiver of each embodiment. Preferably, the second auxiliary energy receiver is expandable, and more preferably, detachable from the first auxiliary energy receive.

In more embodiment of present invention, an electronic device includes a main unit; a display unit integrated with the main body; a tray unit able to install in and uninstall from the main body; and an optoelectronic device package, as described in aforementioned embodiment(s), integrated with the tray unit.

DETAILED DESCRIPTION OF THE INVENTION

Figure 1:
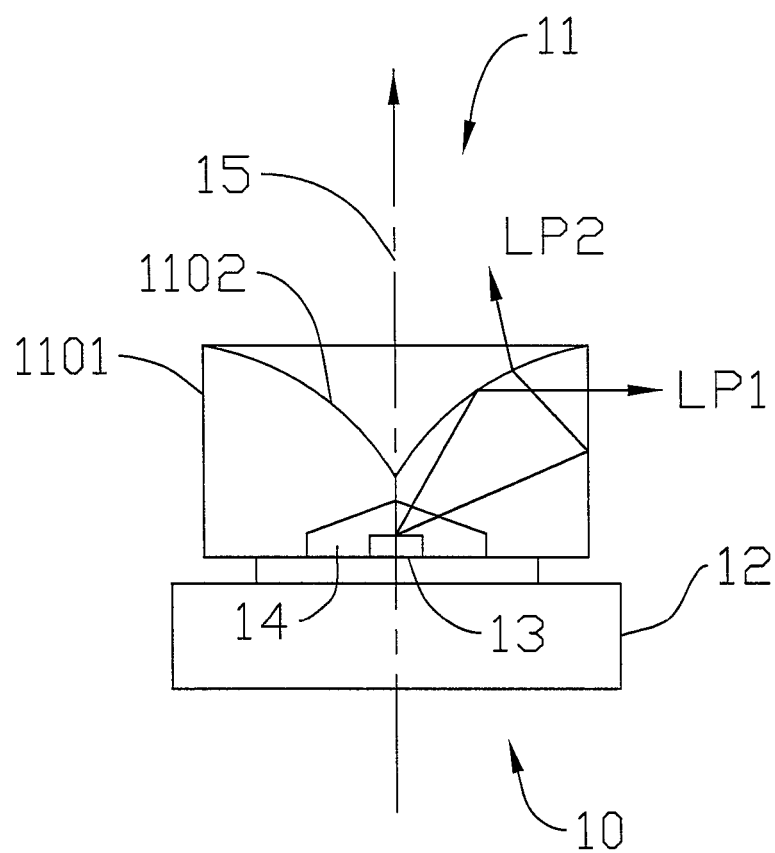
FIG. 1 illustrates a conventional LED package.
Figure 2A:
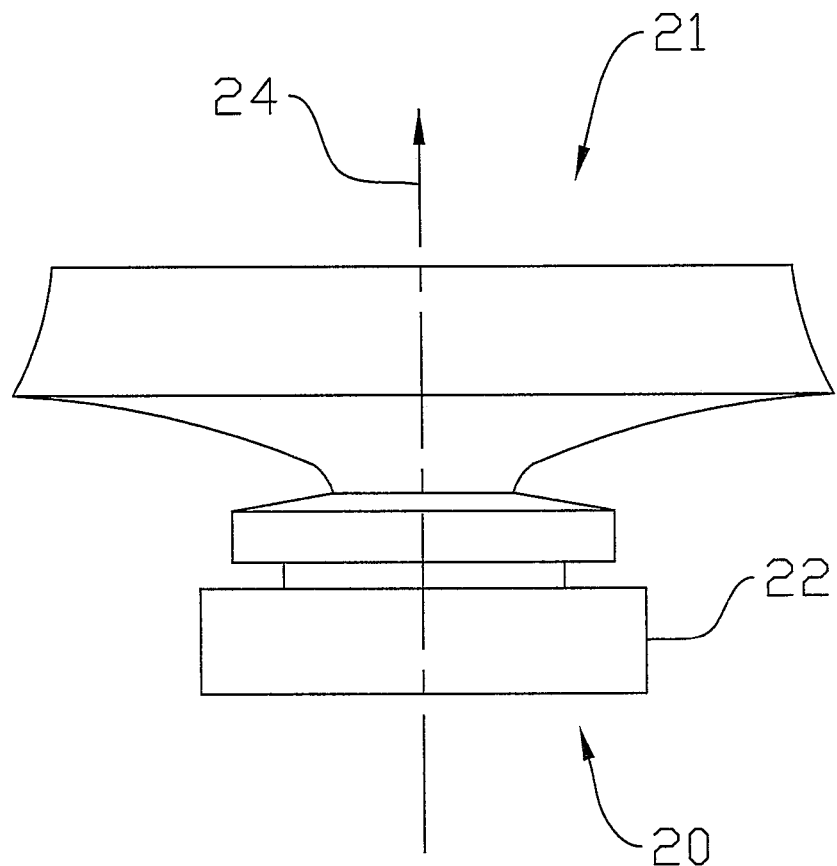
FIG. 2A illustrates one embodiment of the invention.

FIG. 2A illustrates an example of an optoelectronic device package 20 in accordance with one embodiment of the invention. The optoelectronic device package 20 includes an optical element 21, a package base 22 and a longitudinal axis 24. The optical element 21, such as a lens, is coupled to the package base 22 for redirecting light entering thereinto. The longitudinal axis 24 may pass through the center of the optical element 21 or not, and, preferably, be approximately perpendicular to a horizontal surface of the package base 22.

Figure 2B:
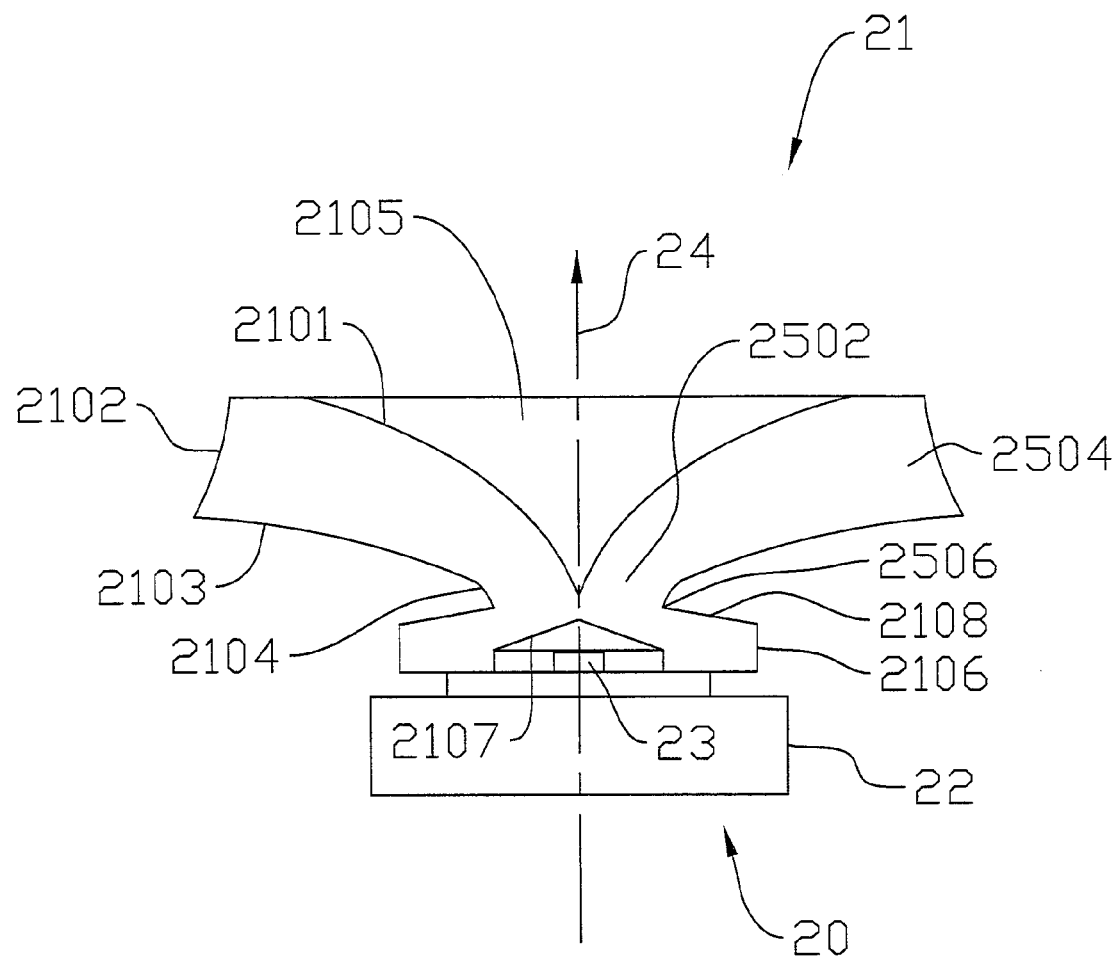
FIG. 2B illustrates a cross sectional view of an optoelectronic device package of FIG. 2A.

FIG. 2B illustrates a cross sectional view of the optoelectronic device package 20 of FIG. 2A. Optoelectronic device 23 is disposed on a surface of the package base 22. The optoelectronic device 23 includes but not limited to an LED chip, laser diode, an incandescent lamp, a fluorescent tube, a Cold Cathode Fluorescent Lamp, solar cell, and any other device able to emit or receive light and be coupled to the optical element 21.

The optical element 21 may be a separate component and attached to the package base 22 by various means including but not limited to screw fixing, snap fitting, friction fitting, adhesive bonding, heat stacking, and ultra-sonic welding. Alternatively, the optical element 21 may be formed onto the package base 22 and/or the optoelectronic device 23 by various means including but not limited to injection molding and casting.

The optical element 21 is made of a light-pervious material. The light-pervious material may be a transparent material or an opaque material being totally or partially pervious to light emitted from or received by the optoelectronic device 23. The light-pervious material includes but not limited to glass, acrylic resin, COC, PMMA, PC, PC/PMMA, Polyetherimide (PEI), fluorocarbon polymer, and silicone. The light-pervious material may be colored to make the optical element 21 acts as a filter in order to generate desired colored light.

If the optoelectronic device package 20 is positioned in an environment filled with air having a refractive index of one, the refractive index of the optical element 21 has to range between 1.4 to 1.8 in order to create the desired field of illumination. The refractive index of the optical element 21 may be a number other than above range based on the environment where the optoelectronic device package 20 resides or be used. Preferably, the difference of the refractive index between the optical element 21 and the environment where it exists is between 0.45 to 0.5.

As shown in FIG. 2B, the optical element 21 includes a flared portion and a base portion 2106. The flared portion has an upper surface 2101 forming a recess 2105 in the light-pervious material, a side surface 2102 adjacent to the upper surface 2101, and a lower surface 2103 adjacent to the side surface 2102. The base portion 2106 is designed to receive light from or direct light to the optoelectronic device 23 and may have a cavity 2107 for accommodating the optoelectronic device 23.

If the optoelectronic device 23 can emit light, the optical element 21 is designed to redirect the majority of light from the optoelectronic device 23 to exit the optical element 21 at the direction approximately normal to the longitudinal axis 24 or the direction not directly pointing to the observer. Furthermore, to avoid a dark spot appearing above the optical element 21, the minority of light from the optoelectronic device 23 may be directed to the direction approximately parallel to the longitudinal axis 24 or the direction pointing to the observer.

The recess 2105 is designed to form the upper surface 2101. Preferably, the recess 2105 may have an apex, where the upper surface 2101 sinks, pointing to the optoelectronic device 23. The apex may be passed by the longitudinal axis 24 or not. A reflective material or structure may be formed on the recess 2105 to totally or partially reflect light traveling to the upper surface 2101. The reflective material or structure includes but not limited to Ag, Al, Cu, Au, Cr, reflective paint, and Distributed Bragg Reflector (DBR). An ultraviolet resistant material may also be formed on the recess 2105 to prevent the package's components, especially those sensitive to ultraviolet, from degradation in the presence of ultraviolet.

In one embodiment of present invention, the optoelectronic device can emit light into the optical element 21 from the side of base portion 2106. The upper surface 2101 can be designed as a total internal reflection (TIR) surface to reflect light entering from the base portion 2106 and prevent it from exiting through the recess 2105, but some light may still pass through the upper surface 2105 at certain incident angle varying with the overall design of the optoelectronic device package 20. The upper surface 2101 may be a flat surface, a rough surface or a curved surface having a constant radius or more than one radius. Specifically, the curved surface may have a variable radius changing along the curved path of the upper surface 2101. Preferably, the radius distant from the apex is larger than that near the apex.

The side surface 2102 is designed to be adjacent to the upper surface 2101 and obliquely angled with respect to the longitudinal axis 24, and in some cases, is used to direct light to the side of the optical element 21, specifically, to the direction approximately normal to the longitudinal axis 24. If the angle between the normal vector of the side surface 2102 and the longitudinal axis 24 is about 90 degree, a high percentage of light exiting through the side surface 2102 will travel downward. On the other hand, if the side surface 2102 is obliquely angled with respect to the longitudinal axis 24 and preferably faces upward, as shown in FIG. 2B, less light will travel downward. The side surface 2102 can be formed in a flat plane, a rough or curved surface. The curved surface can be a concave, a convex, or both. A concave side surface will diverge the light passing through it, while a convex side surface will converge the light passing through it. A rough side surface may scatter light.

The lower surface 2103 is designed to be adjacent to the side surface 2102 and connect to the base portion 2106. The upper surface 2101, the side surface 2102, and the lower surface 2103 form a flared portion above the base portion 2106. The lower surface 2103 may be a flat plane, a rough surface, or a curved surface.

A concaved surface 2104 can be formed between the lower surface 2103 and the base portion 2106. Light emitted from the optoelectronic device 23 and falling on the concaved surface 2104 may be reflected to the area of the recess 2105 and thus increase the amount of light exiting through the recess 2105. The flared portion has a proximal end 2502 and a distal end 2504, and one end 2506 of the lower surface 2103 of the flared portion neighbors the proximal end 2502 of the flared portion. In that case, the observer may not easily detect a dark spot appearing above the recess 2105 of the optical element 21 of the optoelectronic device package 20.

A cavity 2107 can be formed in the base portion 2106 to accommodate the optoelectronic device 23. The cavity 2107 has a volume preferably forming as a cone. The invention is not limited thereto. As shown in FIG. 2E, the cavity 2107 can have a volume forming a pyramid. Further, as shown in FIG. 2F, the cavity 2107 can have a volume forming a hemisphere. The apex of cone or pyramid, or the top of the hemisphere may point to the apex of the recess 2105. The terrace 2108 of the base portion 2106 may be formed as a horizontal plane, a curved surface or an incline. Light passing through the incline sloping at a certain angle may be refracted away from the optoelectronic device 23 and move substantially perpendicular to the longitudinal axis 24.

Figure 2C:
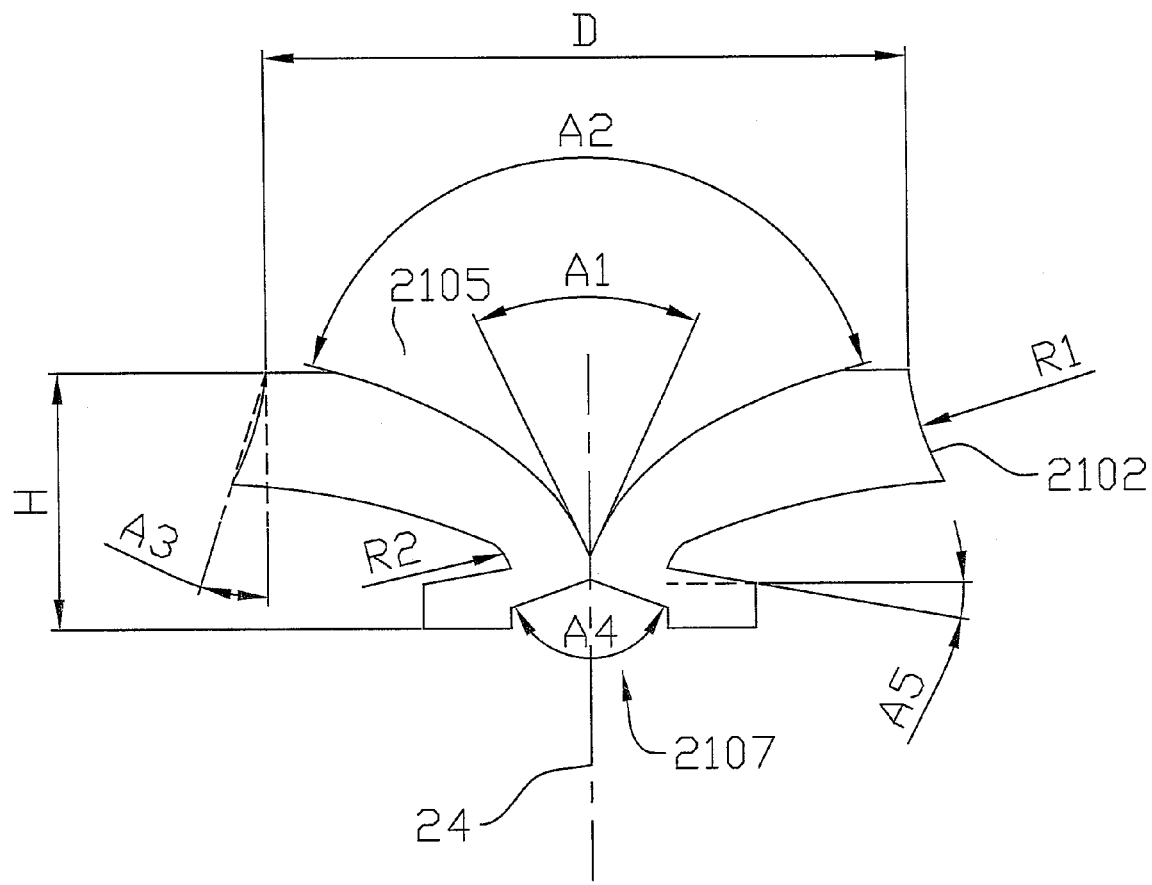
FIG. 2C illustrates a cross sectional view of an optical element coupling to the optoelectronic device package of FIG. 2A.

FIG. 2C illustrates a cross sectional view of the optical element 21 in accordance with another embodiment of the invention. Some sketch lines and notations in FIG. 2C are omitted for clarity. As shown in FIG. 2C, the optical element 21 is presumed to be radially symmetric about the longitudinal axis 24 and has a diameter D of 105 mm and height H of 14 mm. The angle of the apex of the recess 2105 may be varied between A1 degree and A2 degree, wherein A1 is 30 degree and A2 is 180 degree; and preferably, between A1 degree and A2 degree, wherein A1 is 50 degree and A2 is 145 degree. The angle A3 between the side surface 2102 and the longitudinal axis 24 may be varied between 5 degree and 20 degree. The angle A4 of the apex of the cavity 2107 may be varied within 180 degree, preferably between 90 degree and 140 degree. The angle A5 of the slope of terrace 2108 may be varied within 60 degree, preferably within 10 degree. The radius R1 of the side surface 2102 may be varied within 20 mm, preferably within 10 mm. The radius R2 of concaved surface 2104 may be varied within 10 mm. The above dimensions may be adjusted based on the scale and specific design of the optical element 21.

Figure 2D:
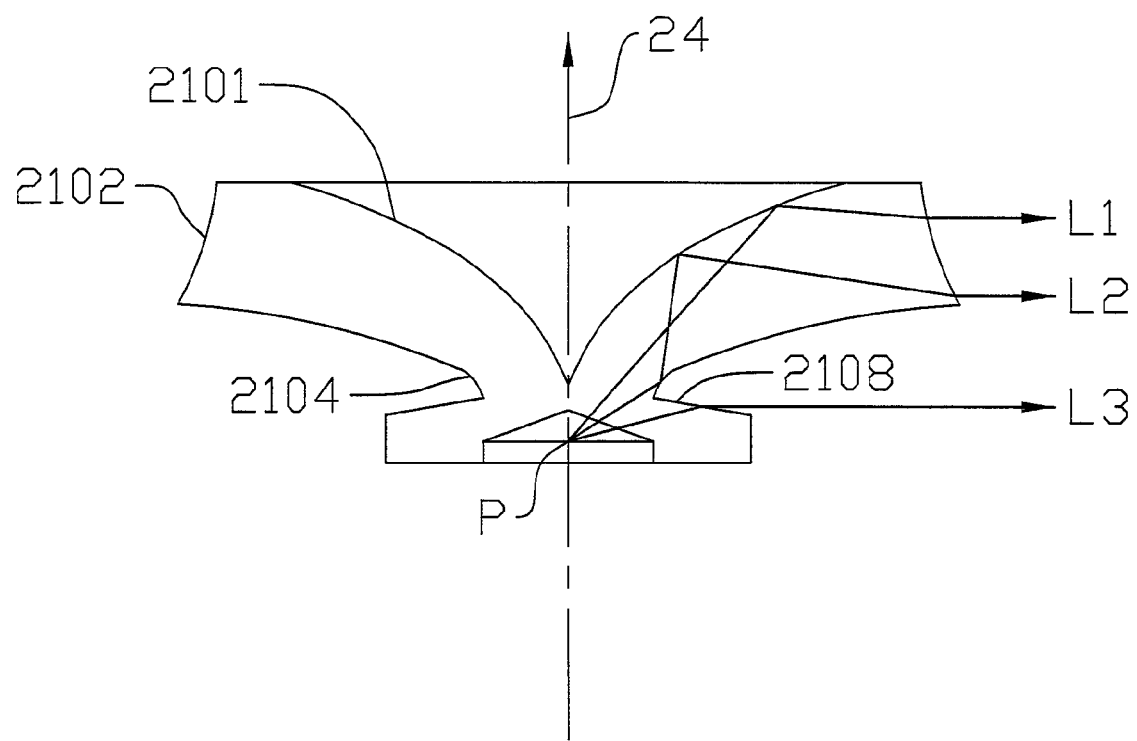
FIG. 2D illustrates ray-traces of one embodiment of the optical element.
Figure 2E:
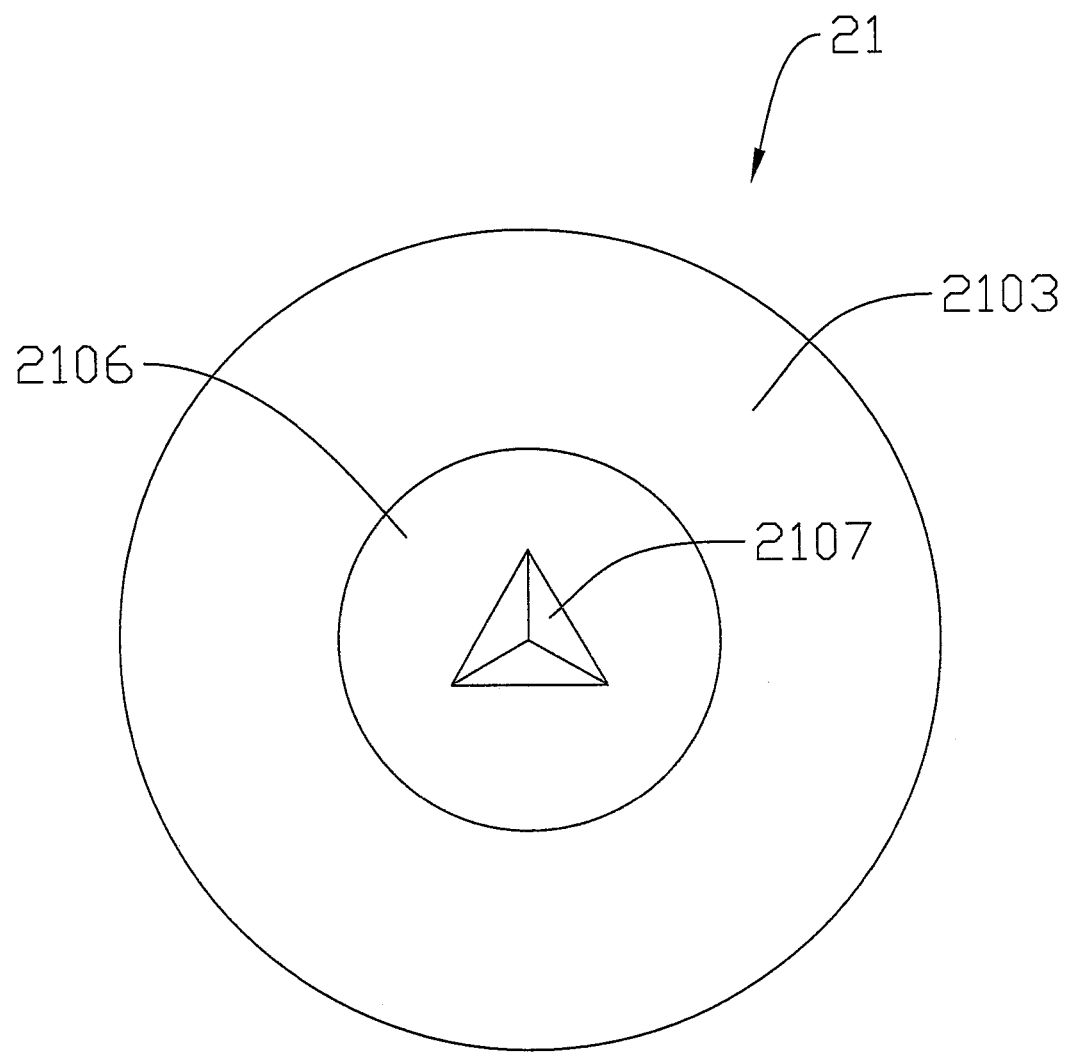
FIG. 2E illustrates a bottom view of an optoelectronic device package of another embodiment of the invention.
Figure 2F:
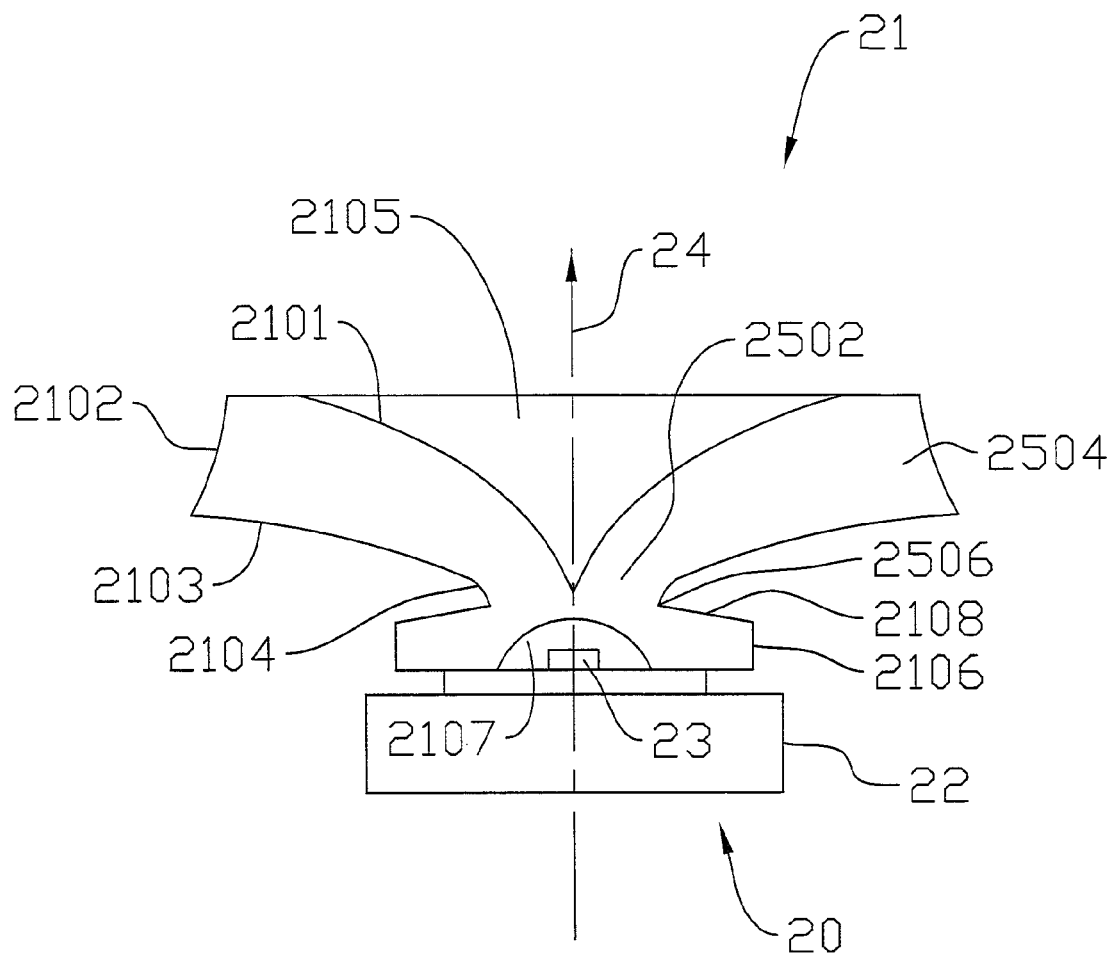
FIG. 2F illustrates a cross sectional view of an optoelectronic device package of embodiment of the invention.

FIG. 2D illustrates ray traces of light through the optical element 21 from an emitting point P inside the base portion. The light trace L1 emitted from the point P and incident on the upper surface 2101 is bent to reach lower surface 2103 or leave optical element 21 for one or more total internal reflections, and horizontally exits the optical element 21 for the refraction caused by the curved side surface 2102. The light trace L2 emitted from the point P and bent on the concaved surface 2104 to the upper surface 2101 is redirected twice for total internal reflection and horizontally exits the optical element 21 for the refraction caused by the curved side surface 2102. The light trace L3 emitted from the point P and incident on the inclined surface of the terrace 2108 is refracted off and horizontally exits out the optical element 21.

The shape of optical element 21 from top view may be an ellipse, a circle, or a rectangle. If the optical element 21 is radially symmetric about the longitudinal axis 24 passing through the center of the optical element 21, the shape of optical element 21 from top view is a circle. In the case, the longitudinal axis 24 may also pass through the apex of the recess 2105. If the optical element 21 is bilaterally symmetric about a central plane dividing the optical element 21 into two identical parts, the shape of optical element 21 from top view can be an ellipse, a circle, or a rectangle. In the case, the longitudinal axis 24 resides on the central plane and may pass through the apex of the recess 2105.

Figure 3A:
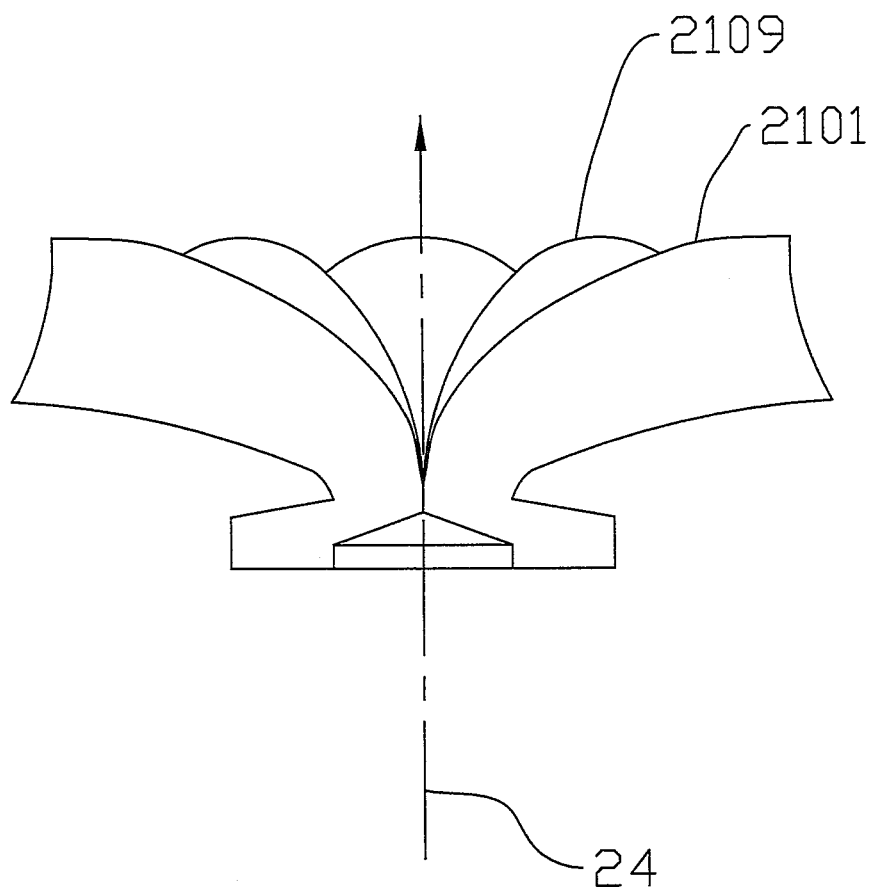
FIG. 3A illustrates a cross sectional view of an optoelectronic device package in accordance with another embodiment of the invention.
Figure 3B:
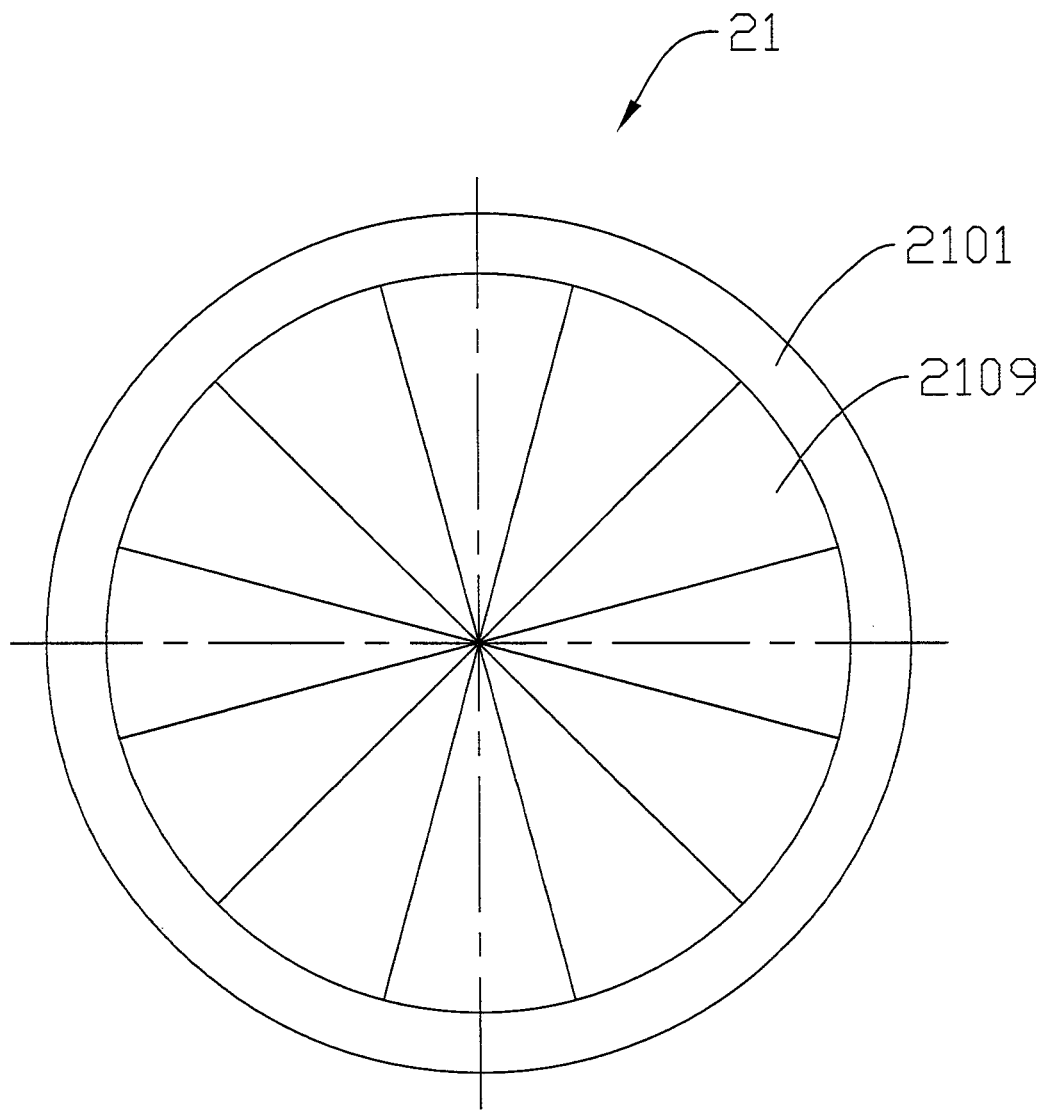
FIG. 3B illustrates a top view of the optoelectronic device package of FIG. 3A.
Figure 3C:
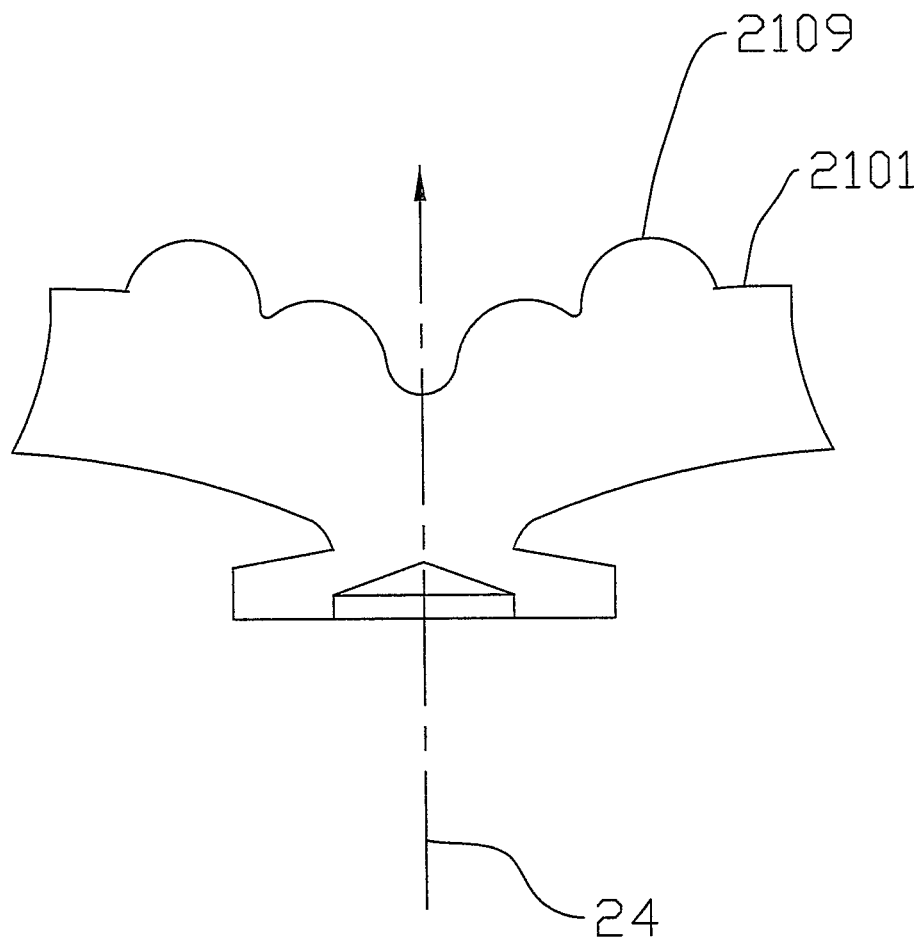
FIG. 3C illustrates a cross sectional view of an optoelectronic device package in accordance with another embodiment of the invention.
Figure 3D:
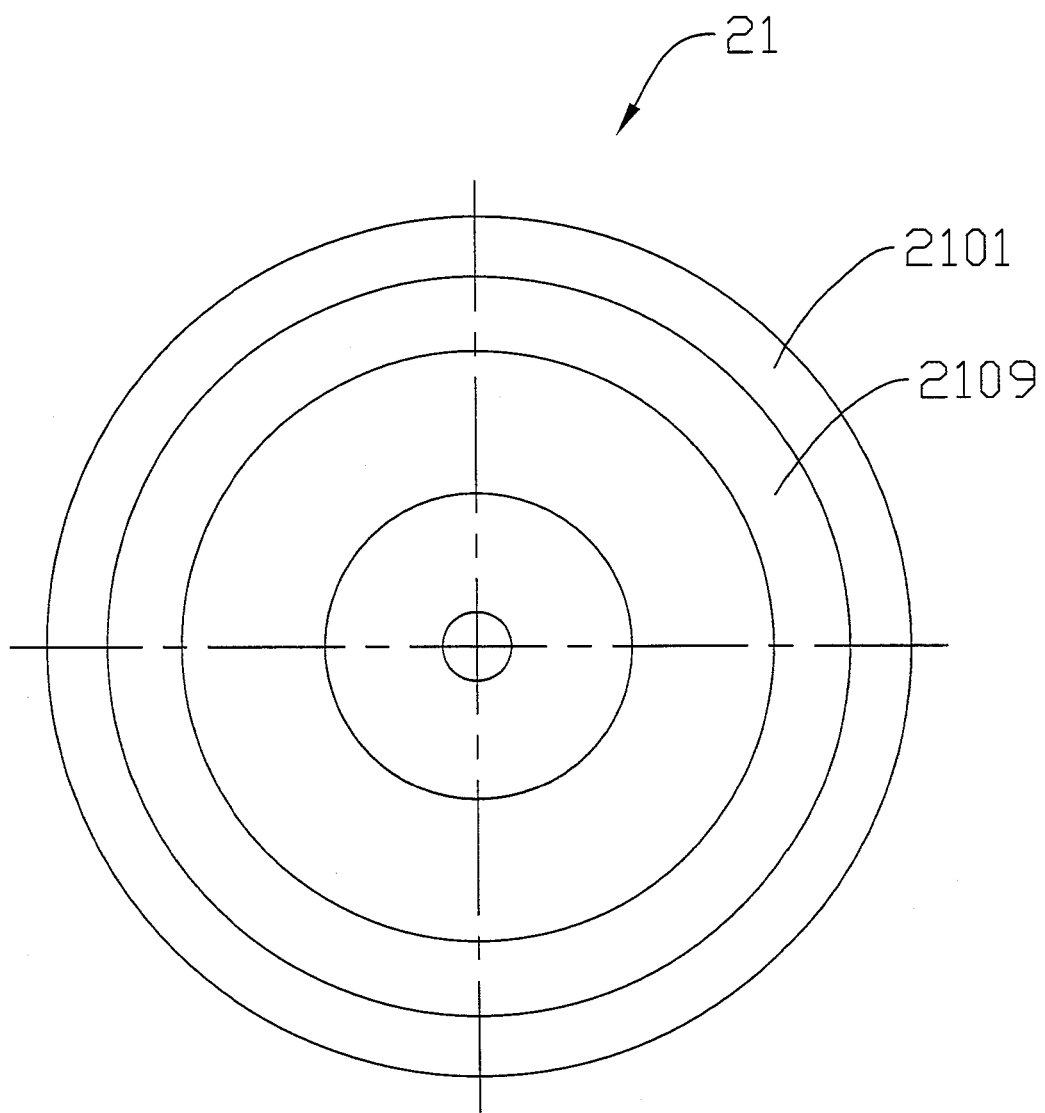
FIG. 3D illustrates a top view of the optoelectronic device package of FIG. 3C.

FIGS. 3A to 3D illustrate the optical elements 21 in accordance with another embodiment of the invention. In this embodiment, the upper surface 2101 of the optical element 21 is formed as a ripply surface. The ripple 2109 of the upper surface 2101 may sweep about the longitudinal axis 24, as shown in FIG. 3A, or move radially outward from the deepest portion of the recess 2105, as shown in FIG. 3C. FIGS. 3B and 3D are the top views of the two types of the ripply surfaces respectively. The ripples 2109 can be formed as a plurality of convex lenses. The radius of the convex lens may be varied about between 50 μm to 60 μm.

Figure 4:
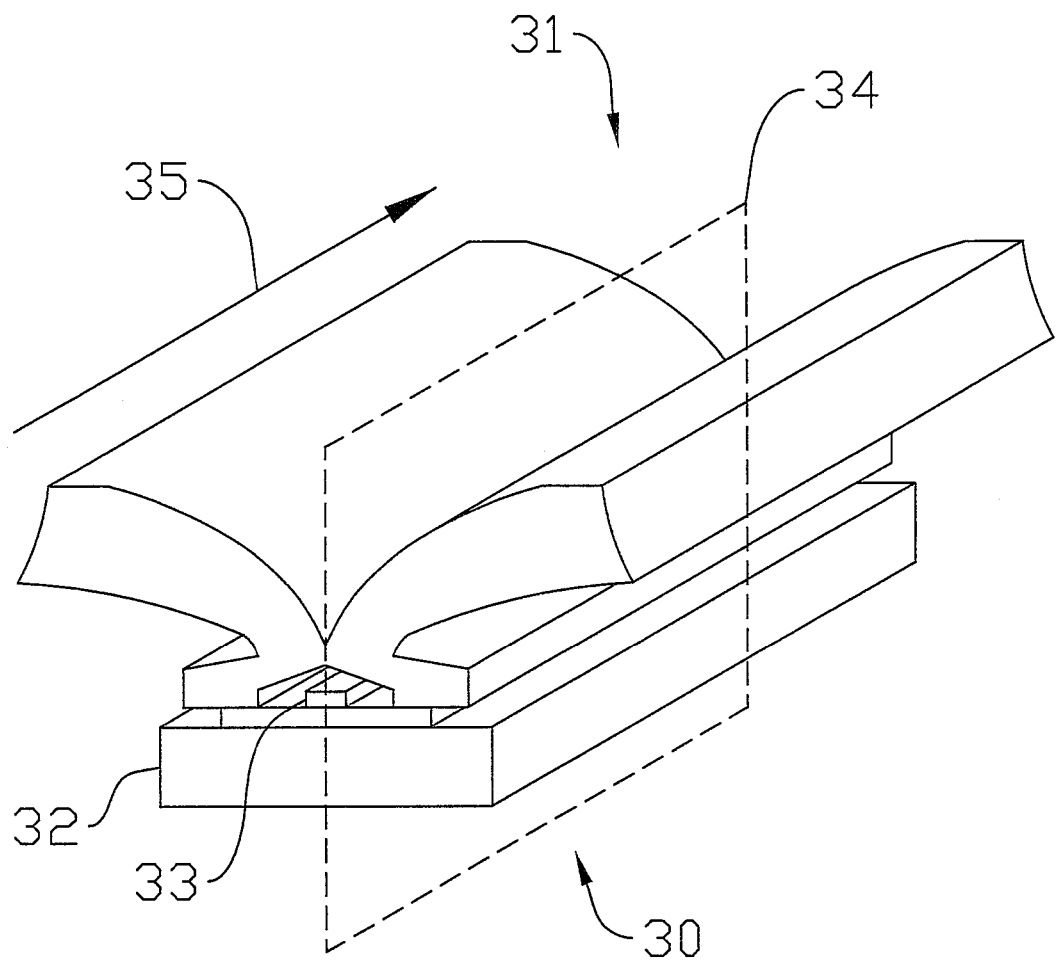
FIG. 4 illustrates a perspective view of further embodiment of the invention.

FIG. 4 illustrates a perspective view of further embodiment of the invention. The optoelectronic device package 30 of present embodiment includes an optical element 31, a package base 32, an optoelectronic device 33, and a longitudinal plane 34. The optical element 31 has a cross section similar to that of the optical element 21 illustrated above. The difference between the optical elements 31 and 21 is that the optical element 31 is formed in a longitudinal direction 35 and passed by a longitudinal plane 34. The longitudinal direction 35 is normal to the cross section of the optical element 31. The longitudinal plane 34 may pass through the centerline of the optical element 31 or not, and, preferably, be approximately perpendicular to a horizontal surface of the package base 32.

Figure 5A:
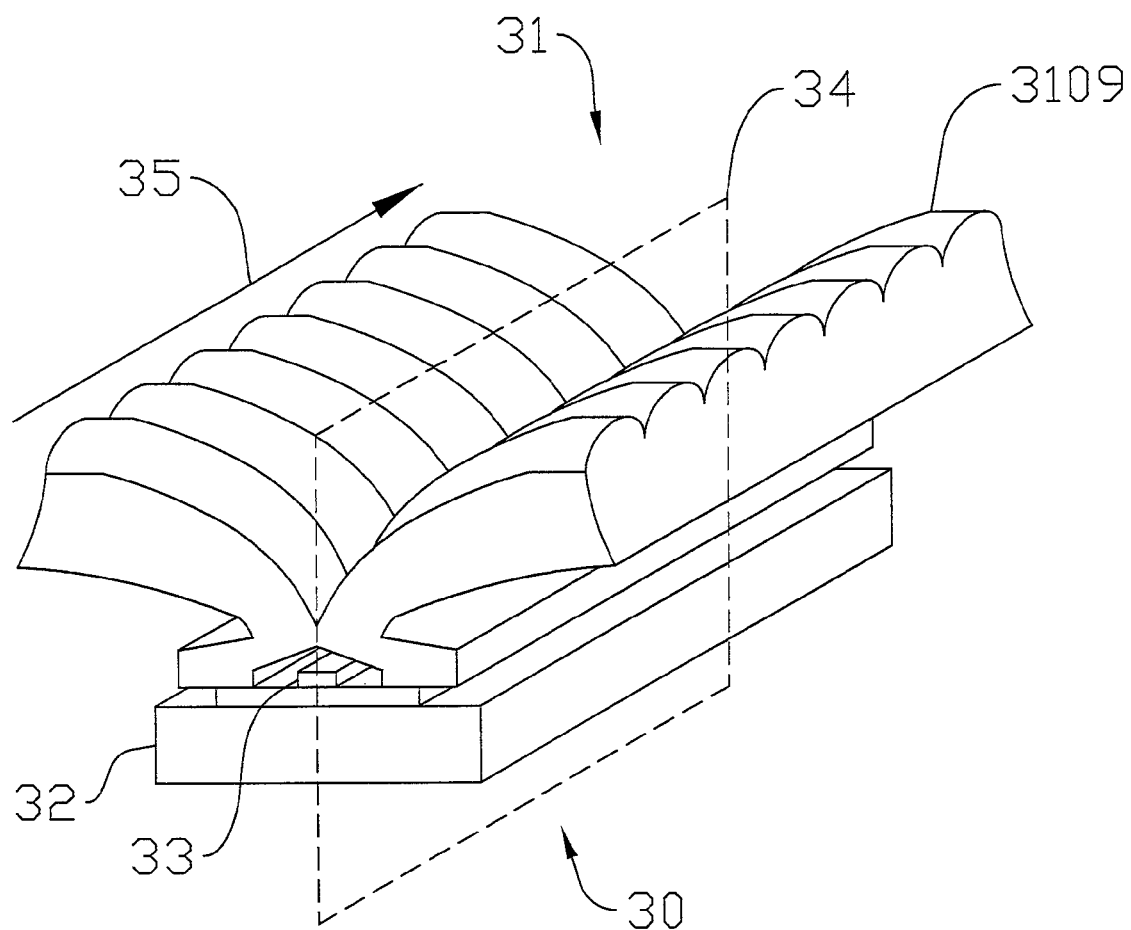
FIG. 5A illustrates a perspective view of another further embodiment of the invention.
Figure 5B:
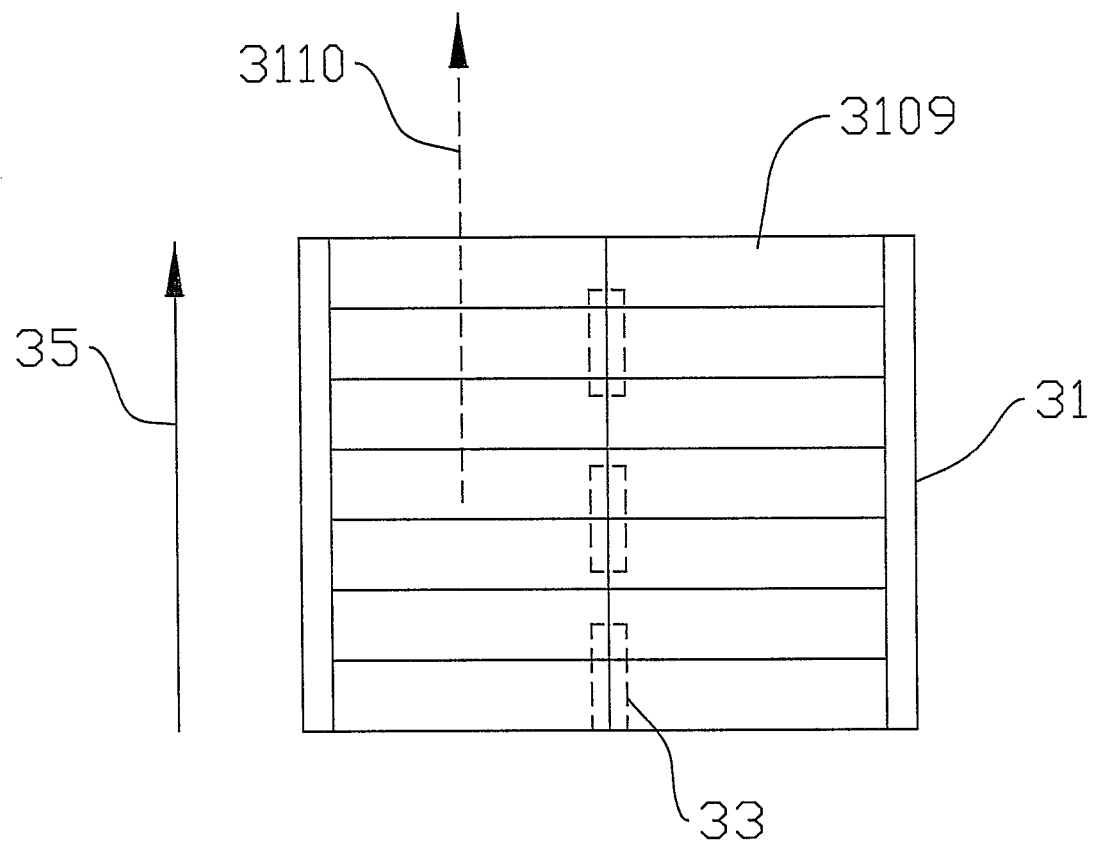
FIG. 5B illustrates a top view of an optoelectronic device package of FIG. 5A.

FIG. 5A illustrates a perspective view of an optoelectronic device package with a ripply upper surface in accordance with an embodiment of the invention. FIG. 5B illustrates the top view of the optoelectronic device package of FIG. 5A. As shown in FIG. 5A, the optoelectronic device package 31 has components similar to those in FIG. 4 except the ripples 3109 formed on the upper surface of the optical element 31. As shown in FIG. 5B, the ripples 3109 run along a propagation direction 3110. The propagation direction 3110 is the direction where the ripples move, and preferably parallels or approximately parallels to the longitudinal direction 35, but other direction is also acceptable. The optoelectronic device 33 may be disposed below the optical element 31, and preferably arranged in a direction parallel to the propagation direction 3110.

Figure 6:
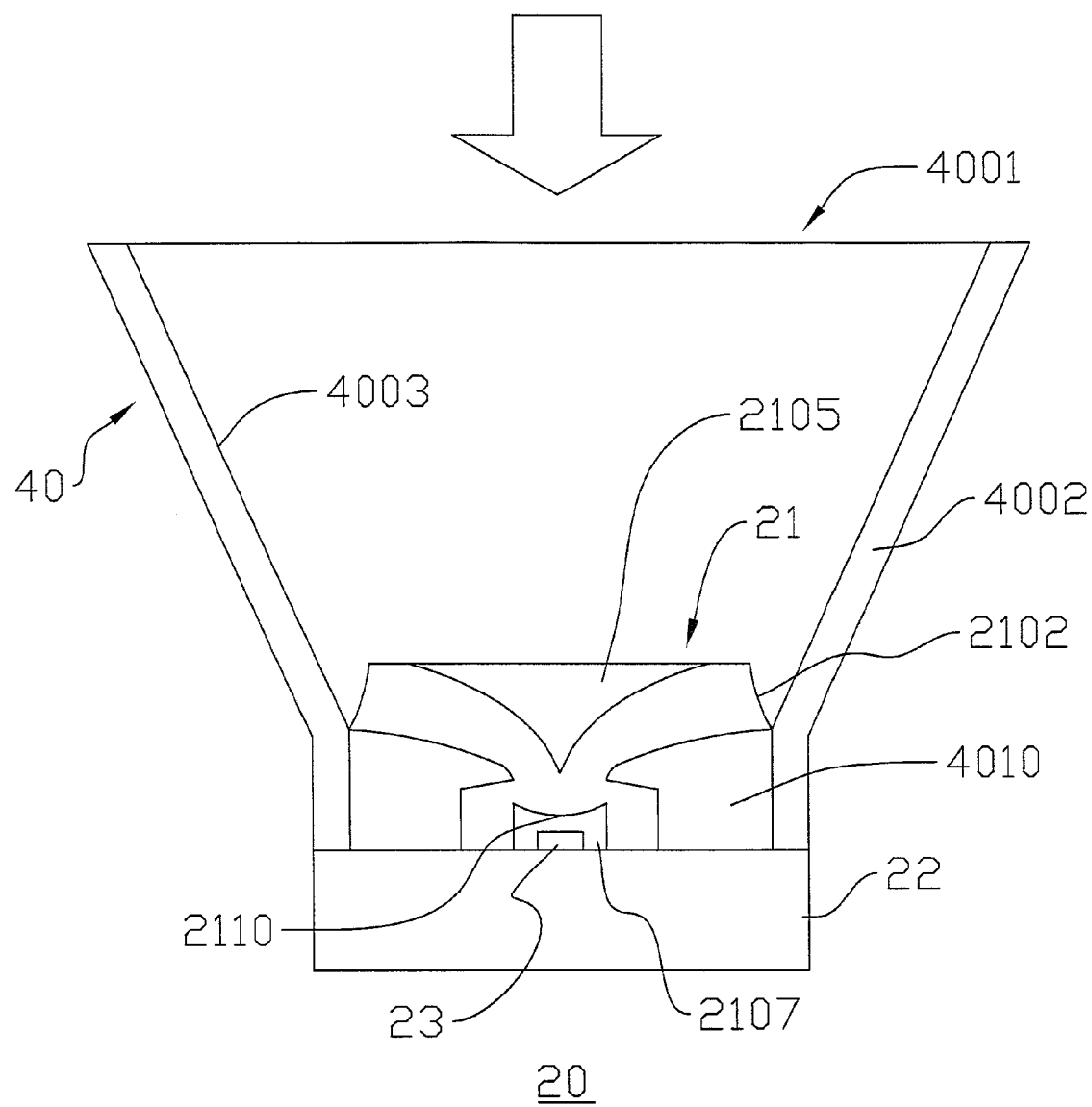
FIG. 6 illustrates a cross sectional view of an optoelectronic device package or assembly capable of receiving radiant energy in accordance with en embodiment of present invention.

As shown in FIG. 6, an optoelectronic device package or assembly 20 in accordance with an embodiment of present invention includes an optical element 21, a package base 22, an optoelectronic device 22, and a first auxiliary energy receiver 40. The detail description of the optical element 21 and the package base 22 can be referred to foregoing embodiments. Besides a light-emitting element such as LED and laser diode, the optoelectronic device 23 of present embodiment is preferably selected from a light-receiving element such as a solar cell and a photo diode.

The optical element 21 is positioned in or optically coupled to the first auxiliary energy receiver 40 which has a first energy inlet 4001, a side wall 4002, and an inner surface 4003. Compared to a bare optoelectronic device 23, such as a solar cell equipped without any additional concentrator, the first auxiliary energy receiver 40 is capable of proving higher energy flux or density to the optoelectronic device 23. If the optoelectronic device 23 is able to convert radiant energy into electric energy, the first auxiliary energy receiver 40 can used to collect radiant energy, such as sun light, ultraviolet, infrared, visible light, X-ray, and γ-ray, entering into the first energy inlet 4001.

The side wall 4002 of the first auxiliary energy receiver 40 is preferably constructed as a reversed truncated conical shape. In other words, the first energy inlet 4001 has a sectional area greater than that of an opposite end of the receiver 40. However, the exterior shape of the first auxiliary energy receiver 40 can also be formed in a truncated pyramid or hemisphere. More preferably, the side wall 4002 is integrated with the inner surface 4003 as a compound parabolic concentrator (CPC) or a power series concentrator. The inner surface 4003 of the side wall 4002 can be optionally formed by or integrated with at least one of a reflective material such as aluminum, silver, cooper, gold, chrome, tin, iron, nickel, manganese, tungsten, bronze, or the alloy or combination thereof; a reflective structure such as conductive or dielectric distributed Bragg reflector (DBR); a scattering material or structure such as photonic crystal; and any combination thereof. Furthermore, the inner surface 4003 can be formed in at least one contour of paraboloid, ellipsoid, hyperboloid, and power series surface.

Specifically, the optical element 21 has a side surface 2102, a recess 2105 and a cavity 2107. In one case, the recess 2105 and the cavity 2107 are respectively formed on opposite side of the optical element 21. As shown in FIGS. 2B and 2F, the cavity can be formed in a volume of pyramid or hemisphere. Furthermore, the cavity 2107 may have a top surface 2110 that is formed in a contour of convex. The convex top surface 2110 facilitates radiant energy from the first energy inlet 4001 to focus on a region of, near or about the optoelectronic device 23. In addition, the top surface 2110 can be formed in a contour of concave, plane (not shown hereinafter), slope, ripple, or any combination thereof. Although the optical element 21 is fitted into the first auxiliary energy receiver 40, as shown in FIG. 6, the present embodiment is not limited thereto. A predetermined spacer or gap may be formed between the first auxiliary energy receiver 40 and the optical element 21. Moreover, a filing material 4010 can be partly or fully formed in the free space between the first auxiliary energy receiver 40 and the optical element 21. The method of forming the filling material includes but not limited to depositing, coating, spraying, stuffing, injecting, absorbing, attaching, adhering, fitting, and screwing. The filing material 4010 can be selected from gas such as air and inert gas, fluid such as water, oil and solvent, and solid such as oxide, semiconductor, metal, ceramic, and plastic.

Figure 7A:
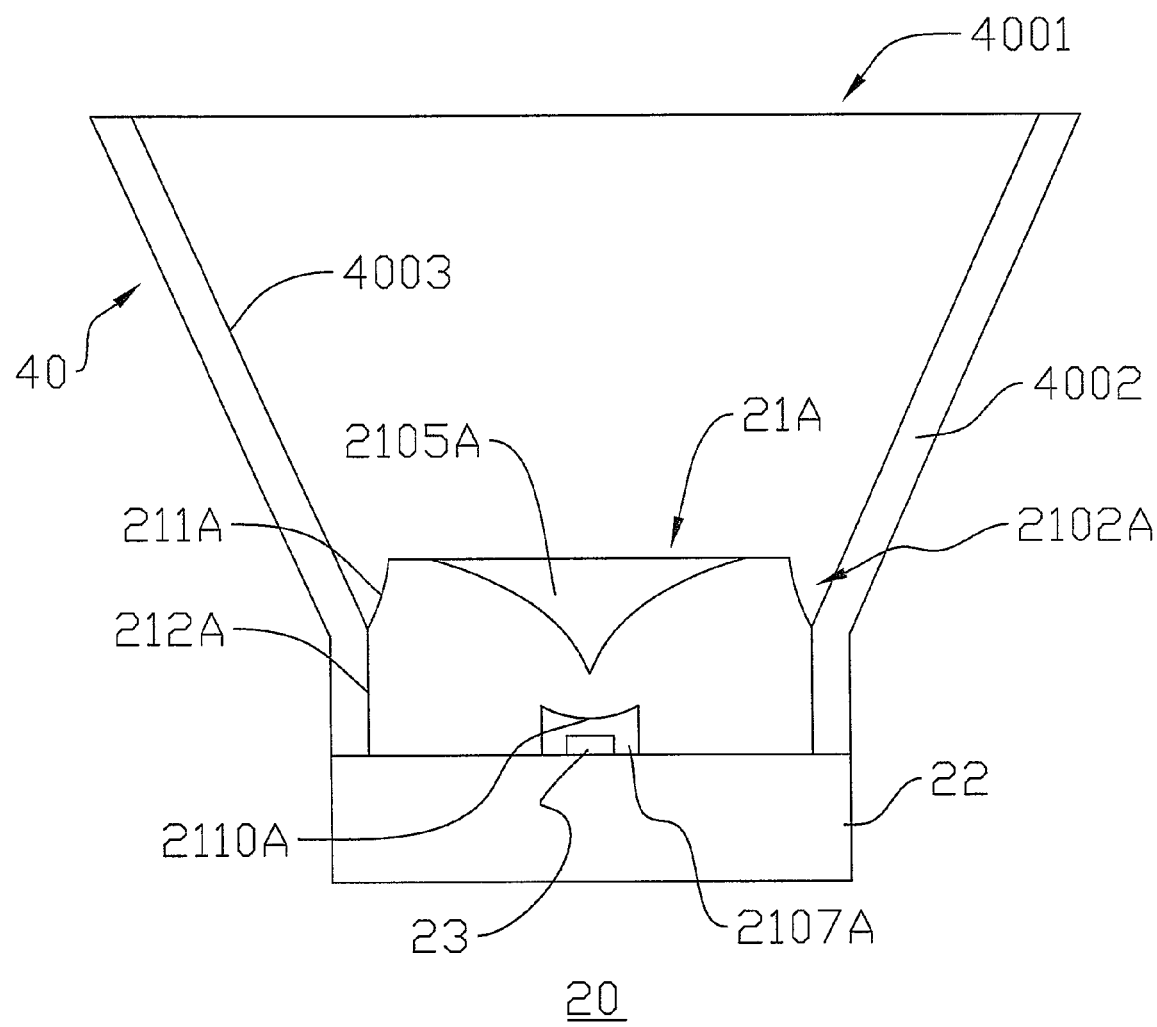
FIGS. 7A to 7D illustrate cross sectional views of optoelectronic device packages or assemblies integrated with different optical elements in accordance with embodiments of present invention.
Figure 7B:
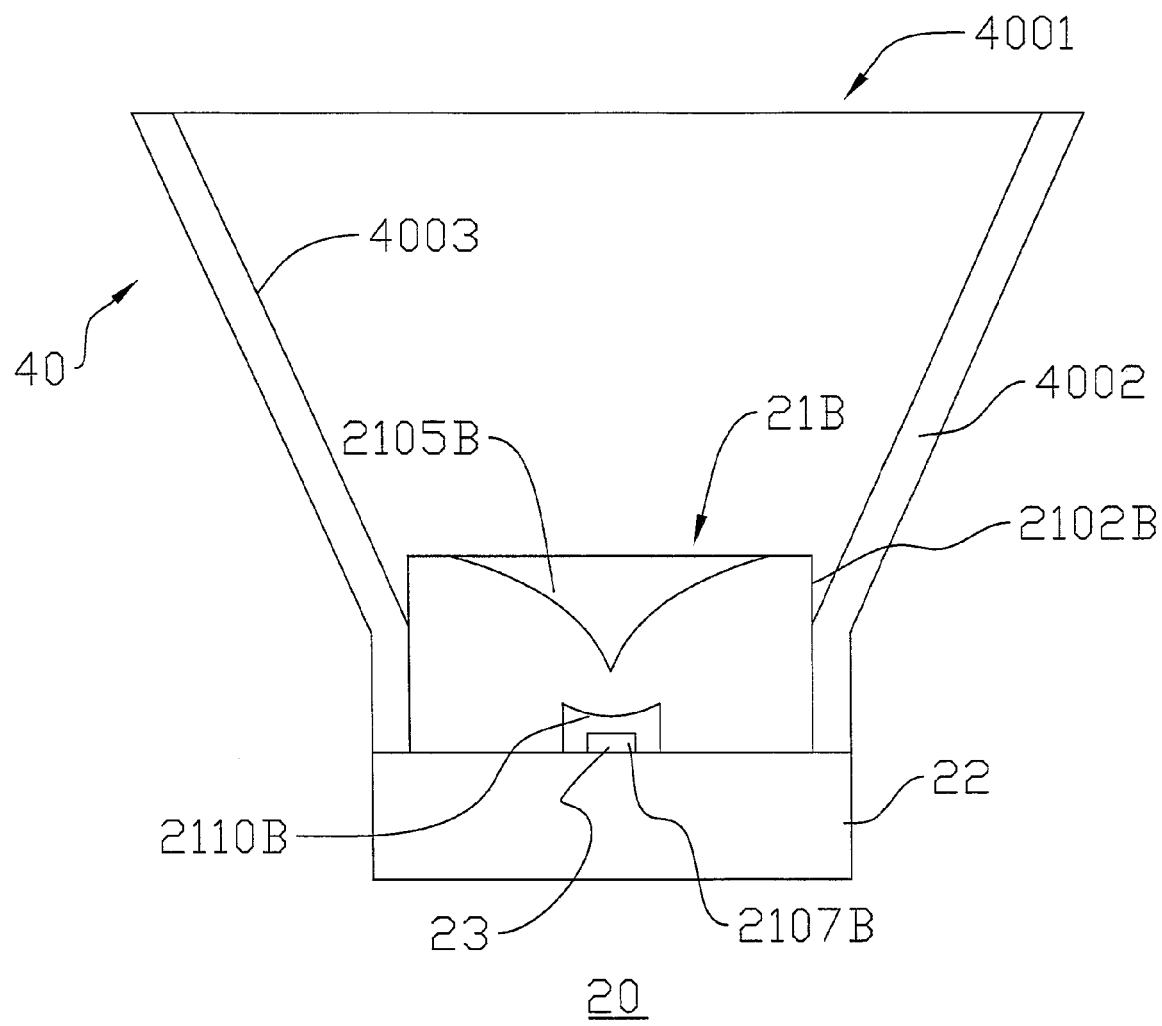
Figure 7C:
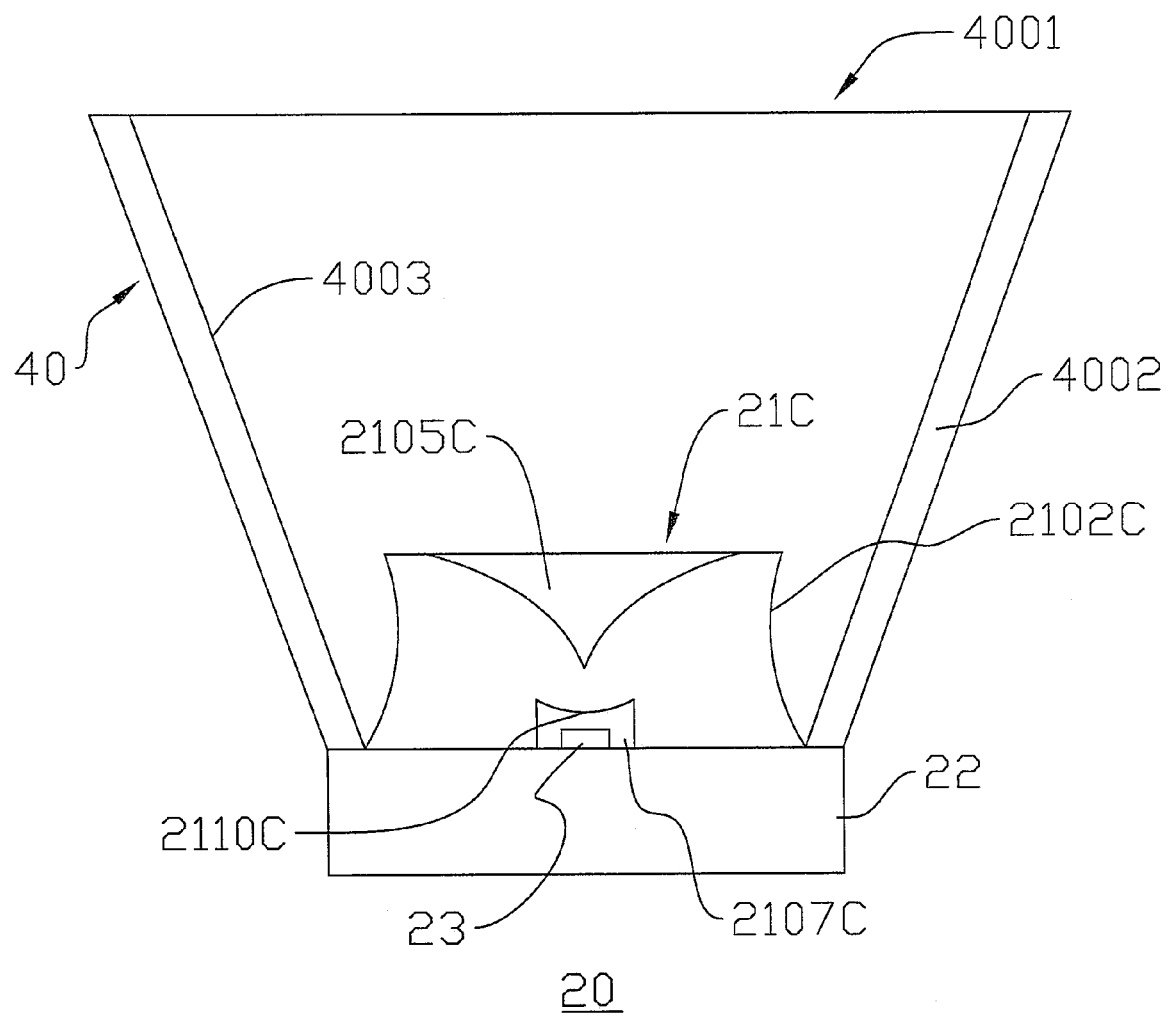
Figure 7D:
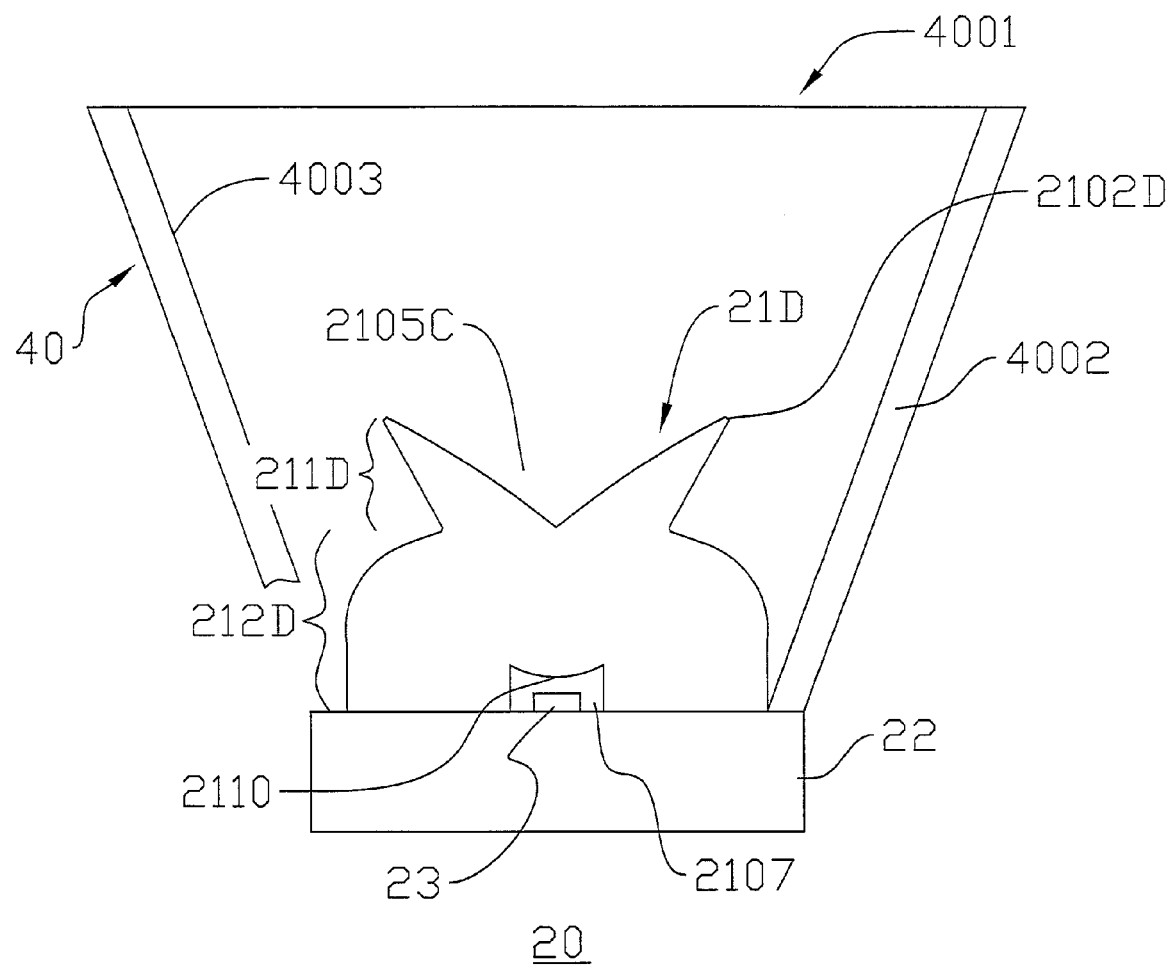
Figure 8:
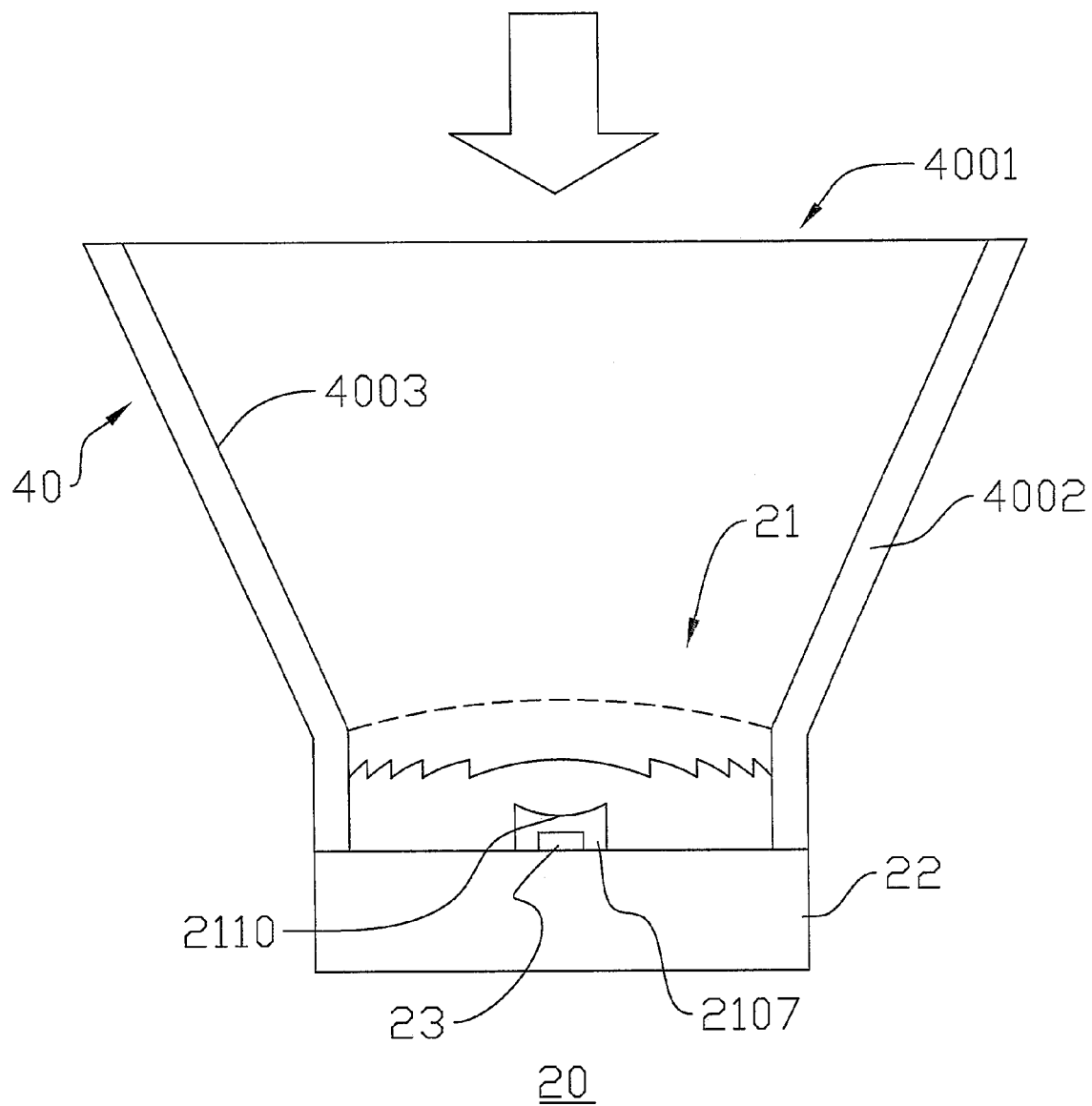
FIG. 8 illustrate a cross sectional views of an optoelectronic device package or assembly integrated with a Fresnel lens or a plano-concave lens in accordance with embodiments of present invention.

FIGS. 7A to 7D illustrate several optoelectronic device packages or assemblies 20 in accordance with another embodiments of present invention. The major difference of the packages between FIGS. 7A to 7D and FIG. 6 is the types of the optical elements adopted with. The optical element 21A of FIG. 7A is provided with a side surface 2102A having an upper portion 211A similar or identical to the side surface 2102 of FIG. 6 and a lower portion 212A adaptable to the first auxiliary energy receiver 40. The optical element 21B of FIG. 7B is provided with a side surface 2102B which is entirely or partly geometrically-adaptable to at least one portion of the first auxiliary energy receiver 40. Specifically, the side surface 2102B is formed in a smooth contour. The optical element 21C of FIG. 7C is provided with a side surface 2102C concaved inwardly. The optical element 21D of FIG. 7D is provided with an upper portion 211D and a lower portion 212D. The upper portion 211D is formed in a funnel shape and has an end portion 2102D which can be deemed as a transformation or a miniature of the side surface 2102. The lower portion 212D is physically connected to the upper portion 211D. In addition, the optical element 21 can be selected from one or any combination of Fresnel lens, plano-convex lens (dotted line), biconvex lens (not shown hereinafter), positive meniscus lens, negative meniscus lens, plano-concave, biconcave lens, and TIR lens, as shown in FIG. 8. Moreover, the optoelectronic device 23 can be optionally accommodated in a cavity 2107 having a top surface 2110. The top surface 2110 can be optionally formed in a contour of concave, plane (not shown hereinafter), slope, ripple, or any combination thereof.

Figure 9A:
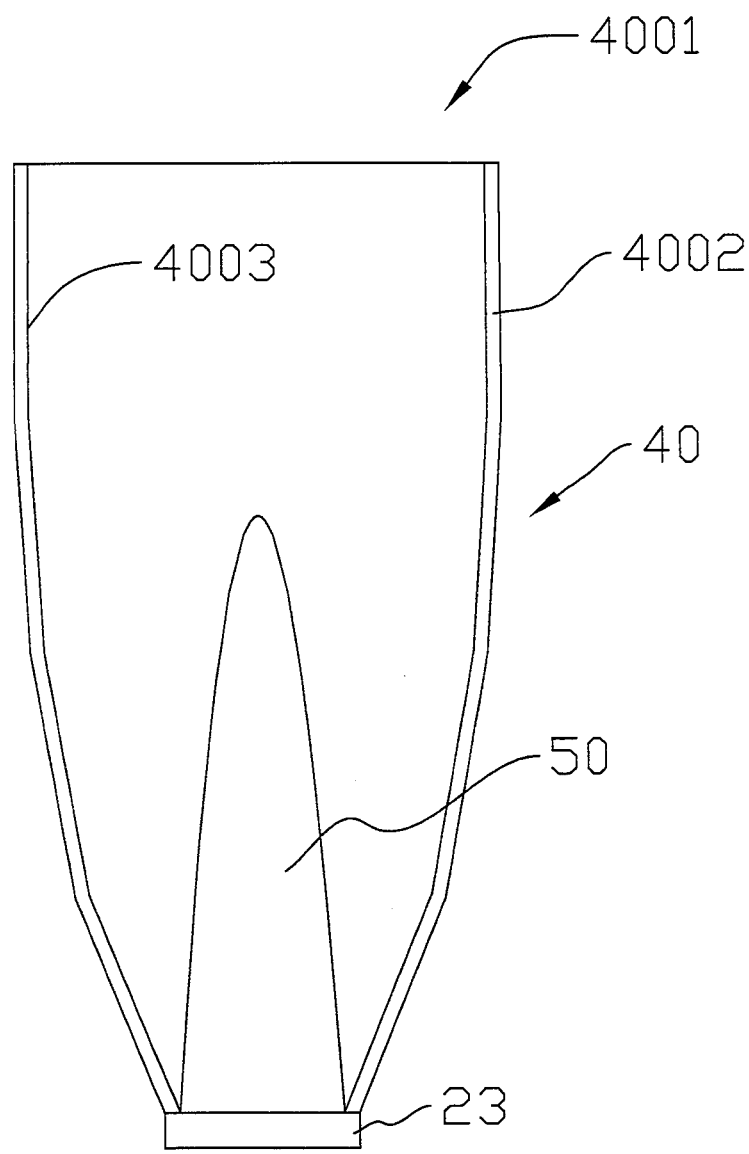
FIGS. 9A and 9B illustrate a cross sectional views of an optoelectronic device package or assembly by integrating with a predetermined optical element in accordance with an embodiment of present invention.
Figure 9B:
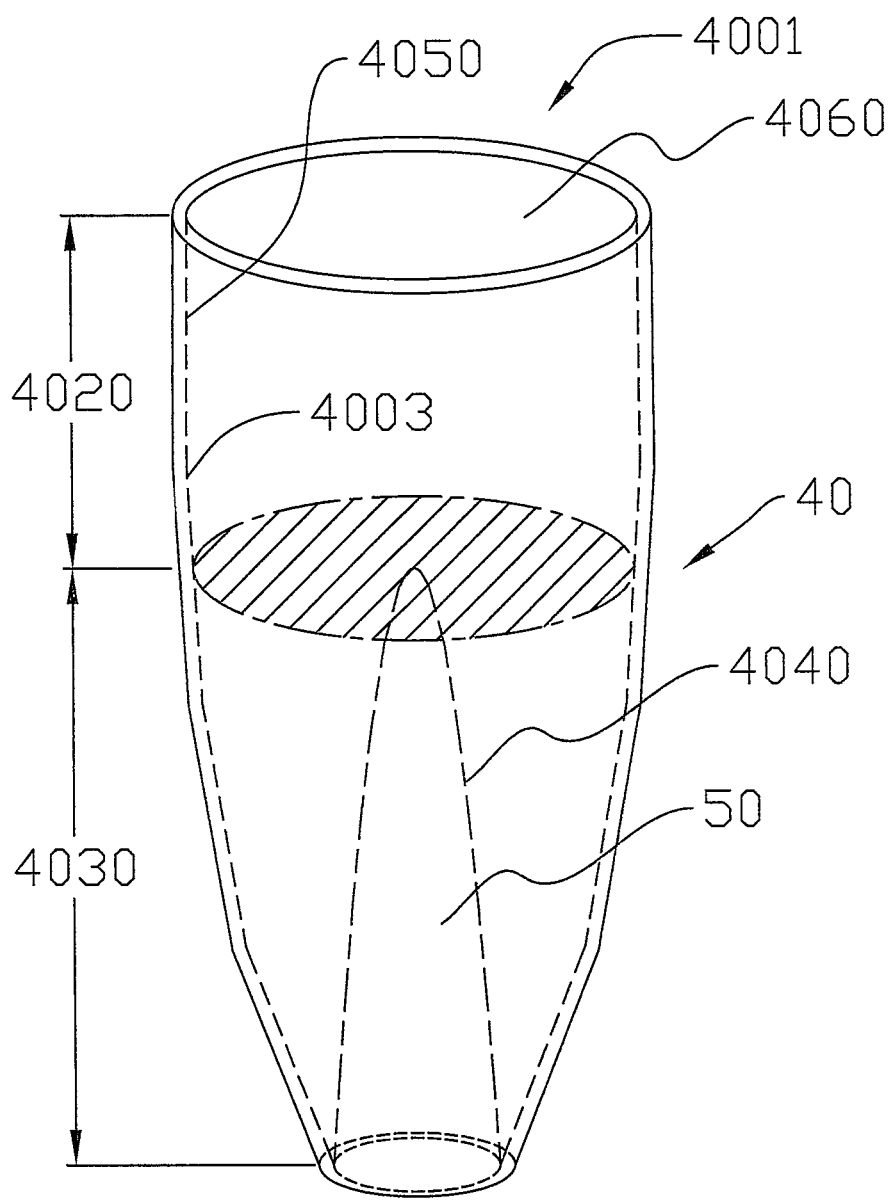

As shown in FIGS. 9A and 9B, an optoelectronic device package or assembly 20 in accordance with further embodiment of present invention includes an optoelectronic device 23, a first auxiliary energy receiver 40, and an optical element 50. The optical element 50 is positioned in or optically coupled to the first auxiliary energy receiver 40. The optoelectronic device 23 is optically coupled to one end of the optical element 50; preferably, to one side opposite to the first energy inlet 4001. The optical element 50 of FIG. 9A is formed in a conical or pyramid shape. The contour of the cone can be selected from one or any combination of paraboloid, ellipsoid, hyperboloid, and power series surface.

FIG. 9B illustrates a perspective view of an assembly of the first auxiliary energy receiver 40 and the optical element 50. The space inside the first auxiliary energy receiver 40 can be virtually divided into a first level inlet 4020 and a second level inlet 4030. The most part of the optical element 50 is preferably arranged within the second level inlet 4030. In other words, none or small part of the optical element 50 is arranged within the first level inlet 4020. The radiant energy entering into the first energy inlet 4001 can move downstream from the first level inlet 4020 to the second level inlet 4030. Otherwise, if the radiant energy is undergone at least one of reflection, refraction, scattering, and guiding inside the first auxiliary energy receiver 40, the radiant energy may move upstream from the second level inlet 4030 to the first level inlet 4020. In some cases, the radiant energy can even move back and forth in one or both of the first level inlet 4020 and the second level inlet 4030.

The interior space of the first auxiliary energy receiver 40 can be confined by an inner boundary 4040, an outer boundary 4050, and a top boundary 4060. The inner boundary 4040 is defined by the optical element 5. The outer boundary 4050 is defined by the side wall 40, more specifically, is defined by the inner surface 4003 or a radiant energy impervious medium between the optical element 50 and the side wall 4002. The top boundary 4060 is defined by the outmost surface of the first energy inlet 4003. Preferably, the inner boundary 4040 is pervious to, while the outer boundary 4050 is impervious to, the radiant energy that is receivable to the optoelectronic device 23. The transmittance of the inner boundary 4040 depends on the material or surface texture of the optical element 50. In numerical expression, the transmittance is about 90%, 80%, 70%, 60%, 50%, 40%, 30%, 20%, 10%, 5%, or ranged between 99.99% and 5%. The outer boundary 4050 is usually constructed by creating at least one of a reflecting and a scattering function outside the inner boundary 4040. For example, the outer boundary 4050 is made by introducing a reflective or scattering material or structure on the inner surface 4003, as described in foregoing embodiment(s).

Moreover, the methodology of explaining the embodiments of FIGS. 9A and 9B can also be applied to that of FIGS. 6, 7A to 7D, and 8. The optical elements 21, 21A~21D, and 50 can be made by a light-pervious material including but not limited to glass, acrylic resin, COC, PMMA, PC, PC/PMMA, Polyetherimide (PEI), fluorocarbon polymer, and silicone.

Figure 10:
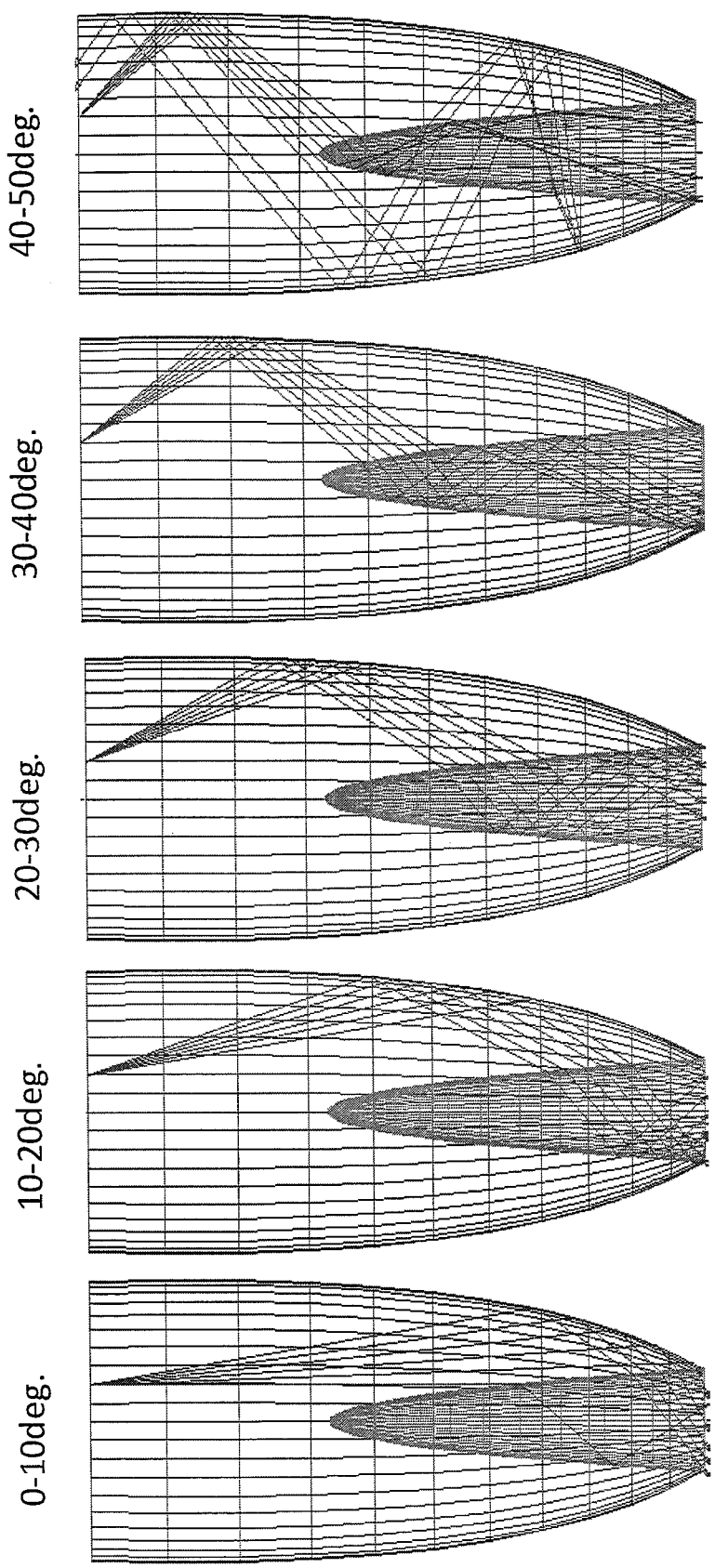
FIG. 10 illustrates ray-traces of the optoelectronic device package or assembly of FIGS. 9A and 9B.

As shown in FIG. 10, the optoelectronic device 20 of present invention shows a capability to receive incident light of a wider angular variation. From the numerical simulations, the light shooting the first energy inlet 4001 by a degree ranged from 0° to 50° can be effectively guided by the first auxiliary energy receiver 40 and the optical element 50 to the target of the optoelectronic device 23. In one inspection of the ray traces, most of light is reflected by the first energy inlet 4001, but reflected and refracted by optical element 50.

Figure 11A:
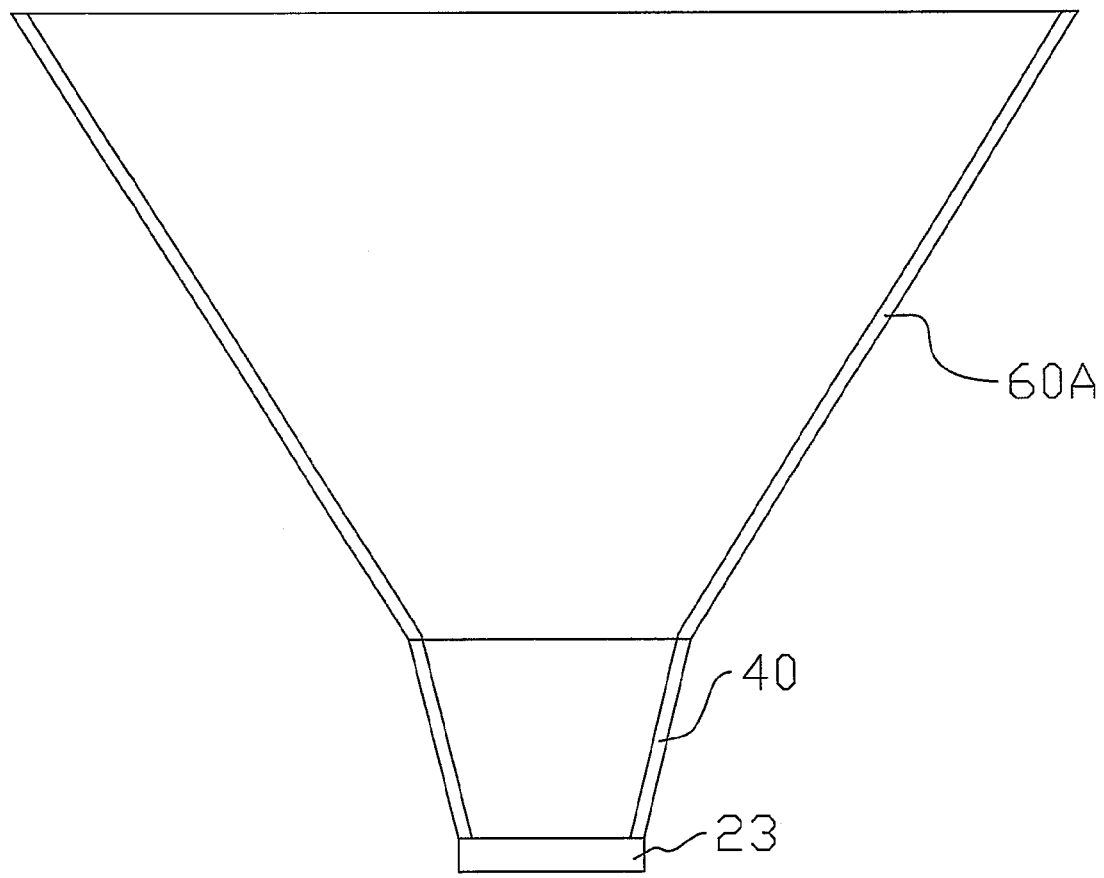
FIGS. 11A and 11B illustrate drawings of an optoelectronic device package or assembly by integrating with an additional or an expandable energy receiver in accordance with further embodiment of present invention.

Besides the first auxiliary energy receiver 40, a second auxiliary energy receiver 60A can be optically integrated with the package 20. In detail, the second auxiliary energy receiver 60A is optically coupled to the first auxiliary energy receiver 40, as shown in FIG. 11A. Preferably, the second auxiliary energy receiver 60 has a function(s) of a compound parabolic concentrator (CPC), a power series concentrator, or both. Furthermore, the second auxiliary energy receiver 60A can have a reflective inner surface formed in at least one contour of paraboloid, ellipsoid, hyperboloid, and power series surface. The exterior shape of the second auxiliary energy receiver 60A is preferably formed in a truncated cone. However, the exterior shape can also be formed in a truncated pyramid or hemisphere.

Figure 11B:
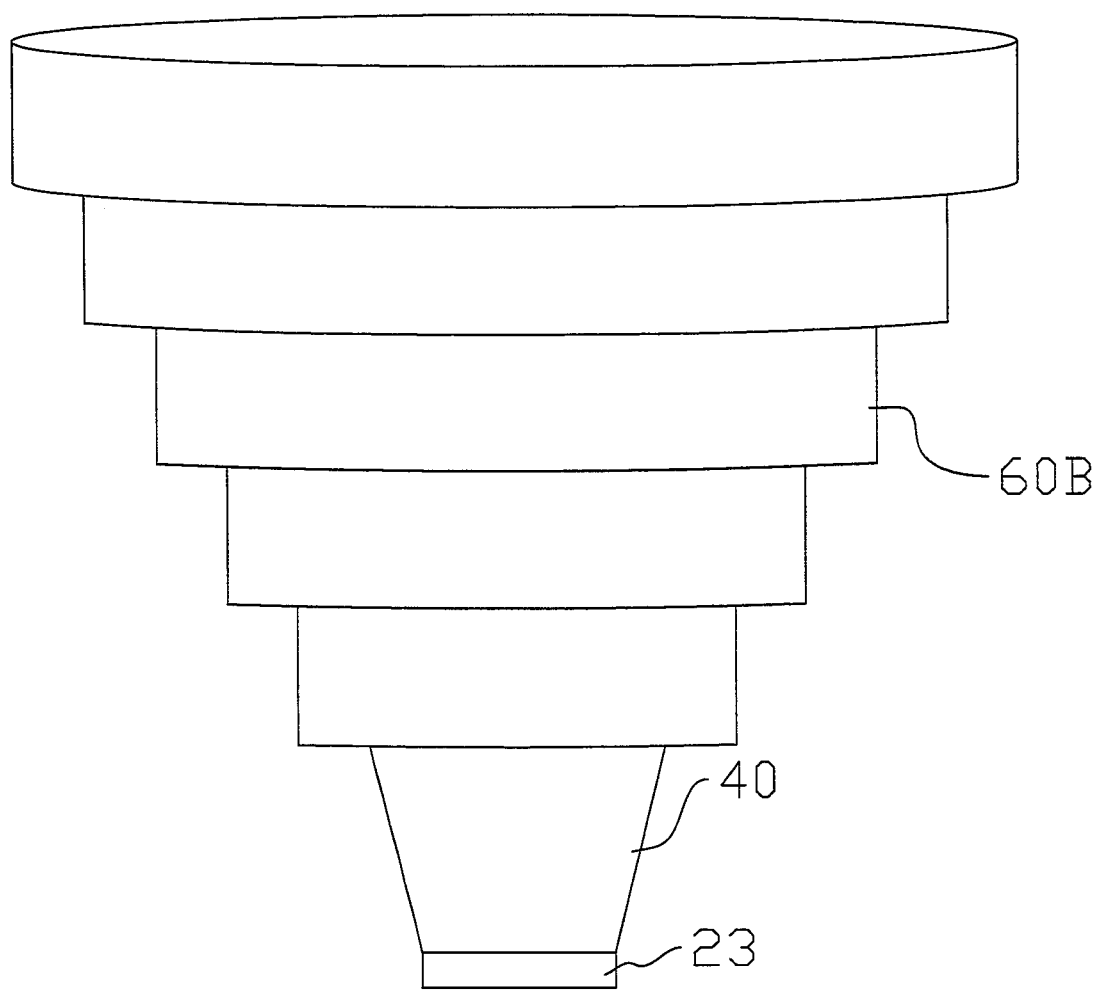

In another embodiment of present invention, a telescopic second auxiliary energy receiver 60B is optically integrate with the package 20, as shown in FIG. 11B. The telescopic second auxiliary energy receiver 60B is expandable, and therefore, can be more easily carried and stored by the user.

Figure 12:
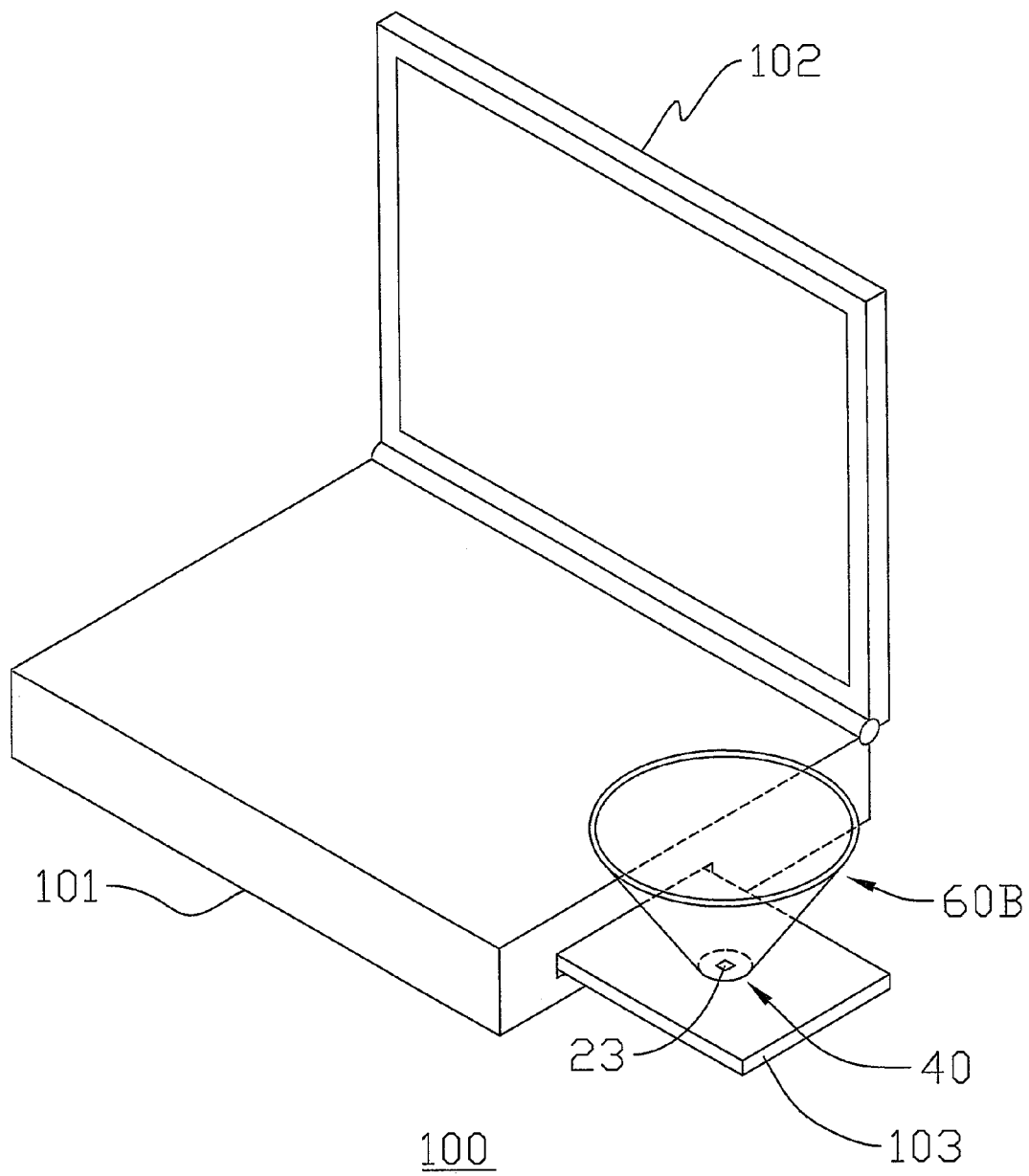
FIG. 12 illustrates a portable electronic device integrated with an optoelectronic device package or assembly in accordance with embodiments of present invention.

A portable electronic device 100 is illustrated in FIG. 12. The portable device 100 is such as a laptop computer, a cell phone, a net book, a music player, personal digital assistant (PDA), and electronic dictionary. Preferably, the portable device 100 includes a main unit 101, a display unit 102, and a tray unit 103. The main unit 101 is equipped with input, output interface(s), or both. The display unit 102 includes a visual information output interface, such as an liquid crystal display (CD), a light-emitting diode, an organic light-emitting diode (OLED), or any combination thereof. The tray unit 103 can be stored in and restored from the main unit 101. An optoelectronic device 40 and a first auxiliary energy receiver 40 are arranged inside or on the tray unit 103. The optoelectronic device 40 is electrically connected to the main unit 101, the display unit 102, or both. Furthermore, a telescopic second auxiliary energy receiver 60B can optionally be coupled to the first auxiliary energy receiver 40 for providing higher energy flux or density to the optoelectronic device 23. In one case, the telescopic second auxiliary energy receiver 60B is detachable from the tray unit 103. Otherwise, the telescopic second auxiliary energy receiver 60B can also be embedded with the tray unit 103.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. An optoelectronic device package, comprising:
a first auxiliary energy receiver having an energy inlet for receiving radiant energy, an outer boundary, and an inner boundary formed in a conical or pyramid shape, wherein the outer boundary has a reflective inner surface and defines the energy inlet, a first level energy inlet downstream of the energy inlet, a second level energy inlet downstream of the first level energy inlet, and an opening wherein the inner boundary is substantially pervious to the radiant energy and extends from the opening in the direction of the energy inlet and is arranged entirely in the second level energy inlet, wherein the inner boundary and the outer boundary are shaped and arranged such that at least some of the radiant energy is deflected by the outer boundary, impinges on the inner boundary, and is refracted by the inner boundary, and at least some of the energy refracted by the inner boundary is reflected interior to the inner boundary toward the opening; and
an optoelectronic device arranged at the opening for receiving the radiant energy via the inner boundary.

2. The optoelectronic device package of claim 1, wherein the inner boundary comprises at least one contour of paraboloid, ellipsoid, hyperboloid, and power series surface.

3. The optoelectronic device package of claim 1, further comprising:
a second auxiliary energy receiver optically coupled to the first auxiliary energy receiver.

4. An electronic device, comprising:
a main unit;
a display unit integrated with the main unit;
a tray unit able to install in and uninstall from the main unit; and
an optoelectronic device package of claim 1 integrated with the tray unit.

5. The optoelectronic device package of claim 1, wherein the optoelectronic device is directly connected to the first auxiliary energy receiver at the opening to define an interior space of the first auxiliary energy receiver, and the inner boundary is interior to the first auxiliary energy receiver.

6. The optoelectronic device package of claim 3, wherein the second auxiliary energy receiver is expandable.

7. The optoelectronic device package of claim 3, wherein the first auxiliary energy receiver comprises a compound parabolic reflector, a power series concentrator, or both.

8. The optoelectronic device package of claim 3, wherein the first auxiliary energy receiver comprises at least one contour of paraboloid, ellipsoid, hyperboloid, and power series surface.

* * * * *